United States Patent
Piano et al.

(10) Patent No.: US 7,222,461 B2
(45) Date of Patent: May 29, 2007

(54) LIGHT TRANSMISSION SYSTEM AND METHOD FOR BUILDINGS

(75) Inventors: Renzo Piano, Paris (FR); Duncan Campbell, Croydon (GB); Alistair Guthrie, Chorleywood (GB)

(73) Assignee: The Nasher Foundation, Dallas, TX (US)

( * ) Notice: Subject to any disclaimer, the term of this patent is extended or adjusted under 35 U.S.C. 154(b) by 0 days.

(21) Appl. No.: 10/377,059

(22) Filed: Feb. 28, 2003

(65) Prior Publication Data

US 2003/0159364 A1 Aug. 28, 2003

Related U.S. Application Data

(60) Provisional application No. 60/360,921, filed on Feb. 28, 2002.

(51) Int. Cl.
 *B62D 63/04* (2006.01)
(52) U.S. Cl. ............................... 52/3; 52/200; 52/208
(58) Field of Classification Search .................. 52/200, 52/3, 22, 173.3, 208, 202
 See application file for complete search history.

(56) References Cited

U.S. PATENT DOCUMENTS

| | | | | |
|---|---|---|---|---|
| 2,918,023 A | | 12/1959 | Bettcher | |
| 3,350,819 A | * | 11/1967 | Polidoro et al. | 52/1 |
| 3,511,559 A | * | 5/1970 | Foster | 359/591 |
| 3,709,583 A | * | 1/1973 | Pfannkuch et al. | 359/593 |
| 4,333,448 A | | 6/1982 | Johnson | |
| 4,809,468 A | | 3/1989 | Bareiss | |
| 5,118,543 A | | 6/1992 | McColl | |
| 5,493,824 A | * | 2/1996 | Webster et al. | 52/200 |
| 5,502,935 A | * | 4/1996 | Demmer | 52/200 |
| 5,546,712 A | * | 8/1996 | Bixby | 52/200 |
| 5,655,339 A | * | 8/1997 | DeBlock et al. | 52/200 |
| 5,729,387 A | | 3/1998 | Takahashi et al. | |
| 5,878,539 A | * | 3/1999 | Grubb | 52/200 |
| 6,105,318 A | * | 8/2000 | Harrison | 52/200 |
| 6,363,667 B2 | * | 4/2002 | O'Neill | 52/200 |
| 6,504,649 B1 | | 1/2003 | Myers | |
| 6,604,329 B2 | * | 8/2003 | Hoy et al. | 52/200 |

* cited by examiner

*Primary Examiner*—Basil Katcheves
(74) *Attorney, Agent, or Firm*—Haynes and Boone, LLP

(57) ABSTRACT

A light transmission system and method for a building according to which shading surfaces are provided on the roof of the building for preventing direct sunlight from passing through a roof light, while permitting the maximum amount of indirect sunlight to pass through the roof light.

35 Claims, 18 Drawing Sheets

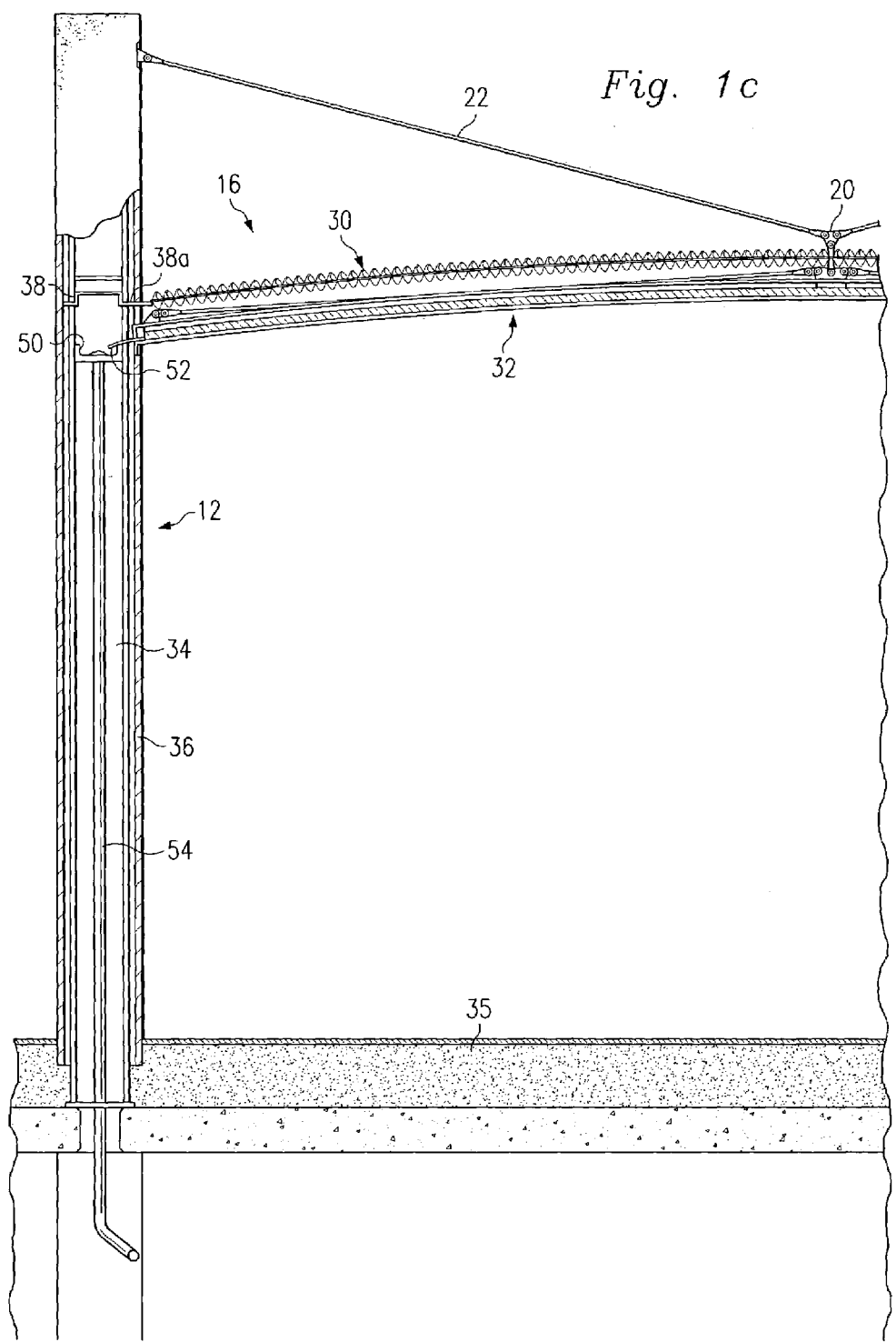

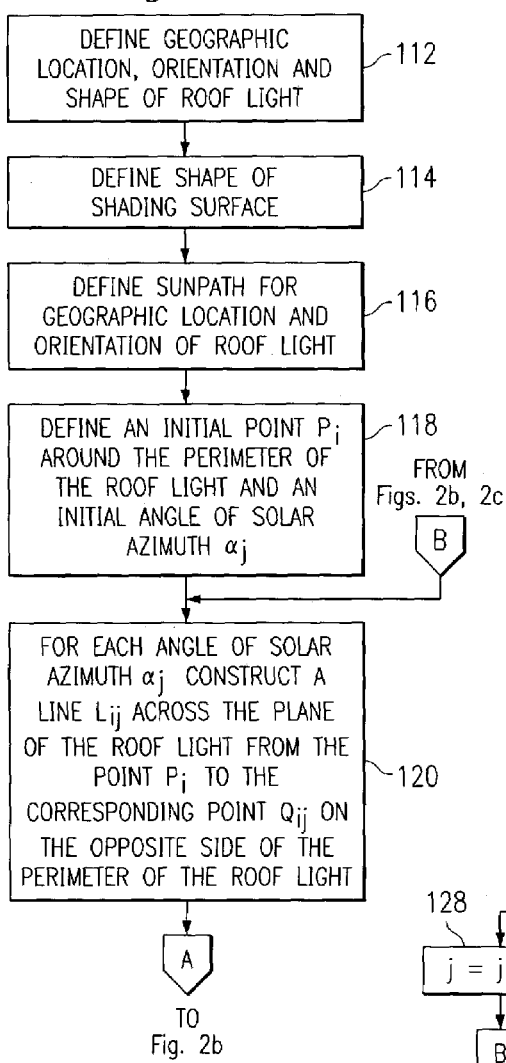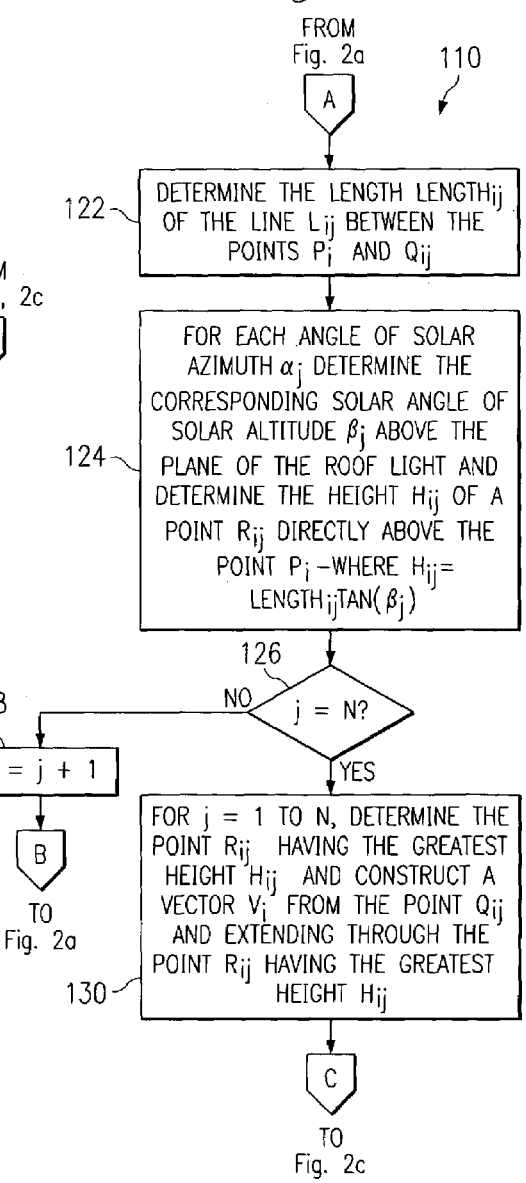

LIGHT TRANSMISSION SYSTEM AND METHOD FOR BUILDINGS

BACKGROUND

This invention relates generally to buildings and, in particular, to buildings including light transmission systems for shading the interior of the building.

In order to provide optimal viewing of objects within a building, such as, for example, paintings, sculptures, or other artifacts within a museum, or the like, it is desirable to use indirect natural, or ambient, light in order to maximize the aesthetic quality of the appearance of such objects. However, conventional methods of providing such indirect light do not provide sufficient lighting levels within the interior spaces of most buildings of this type.

The present invention is directed to overcoming the limitations of the above prior art techniques by providing indirect ambient light into the interior of a building in a manner to maximize the aesthetic quality of the objects therein.

BRIEF DESCRIPTION OF THE DRAWINGS

FIG. 1b is a enlarged perspective view of a section of the building of FIG. 1a.

FIG. 1c is a partial sectional-partial elevational view of the building section of FIG. 1b.

FIGS. 2a-2c are flow chart illustrations of an embodiment of a method for designing a shading system for the building of FIGS. 1a-1d.

FIG. 19b is a side view of the embodiment of the shading systems for the upper and lower triangular sections of the square roof light of FIG. 19a.

FIG. 20b is a cross sectional view of the roof light module of FIG. 20a.

DESCRIPTION OF ILLUSTRATIVE EMBODIMENTS

Figure 1A:
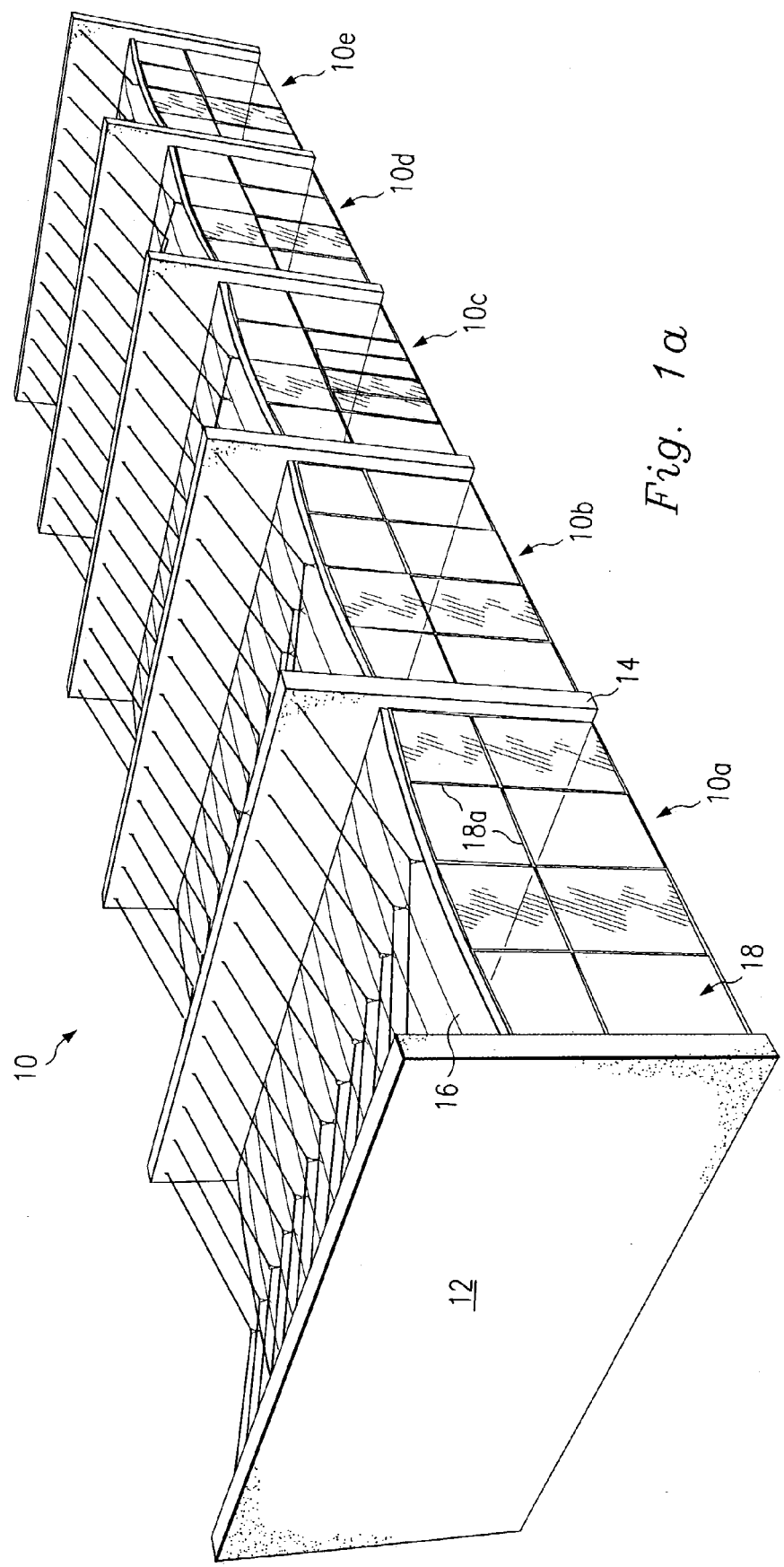
FIG. 1a is a perspective view of a building according to an embodiment of the invention.

Referring to FIG. 1a, a building according to an example of the invention is referred to, in general, by the reference numeral 10 and is formed by five longitudinally-spaced, contiguous sections, or modules, 10a, 10b, 10c, 10d and 10e. The section 10a is formed by an upright end wall 12 and an upright wall 14 which extends in a parallel, spaced relation to the wall 12 and serves as a common wall between the sections 10a and 10b. An arched roof assembly 16, which will be described in detail later, extends between the walls 12 and 14 and below the upper ends of the walls.

A front wall 18 extends between the walls 12 and 14 and generally perpendicular to the roof assembly 16. The front wall 18 is preferably of a transparent or translucent material, such as glass, and is divided into a plurality of rectangular sections by a plurality of spaced and intersecting struts 18a. Although not shown in the drawing, it is understood that the section 10a includes a rear wall which may be identical, or similar to, the front wall 18. Since the sections 10b-10e are identical to section 10a, they will not be described in detail.

Figure 1B:
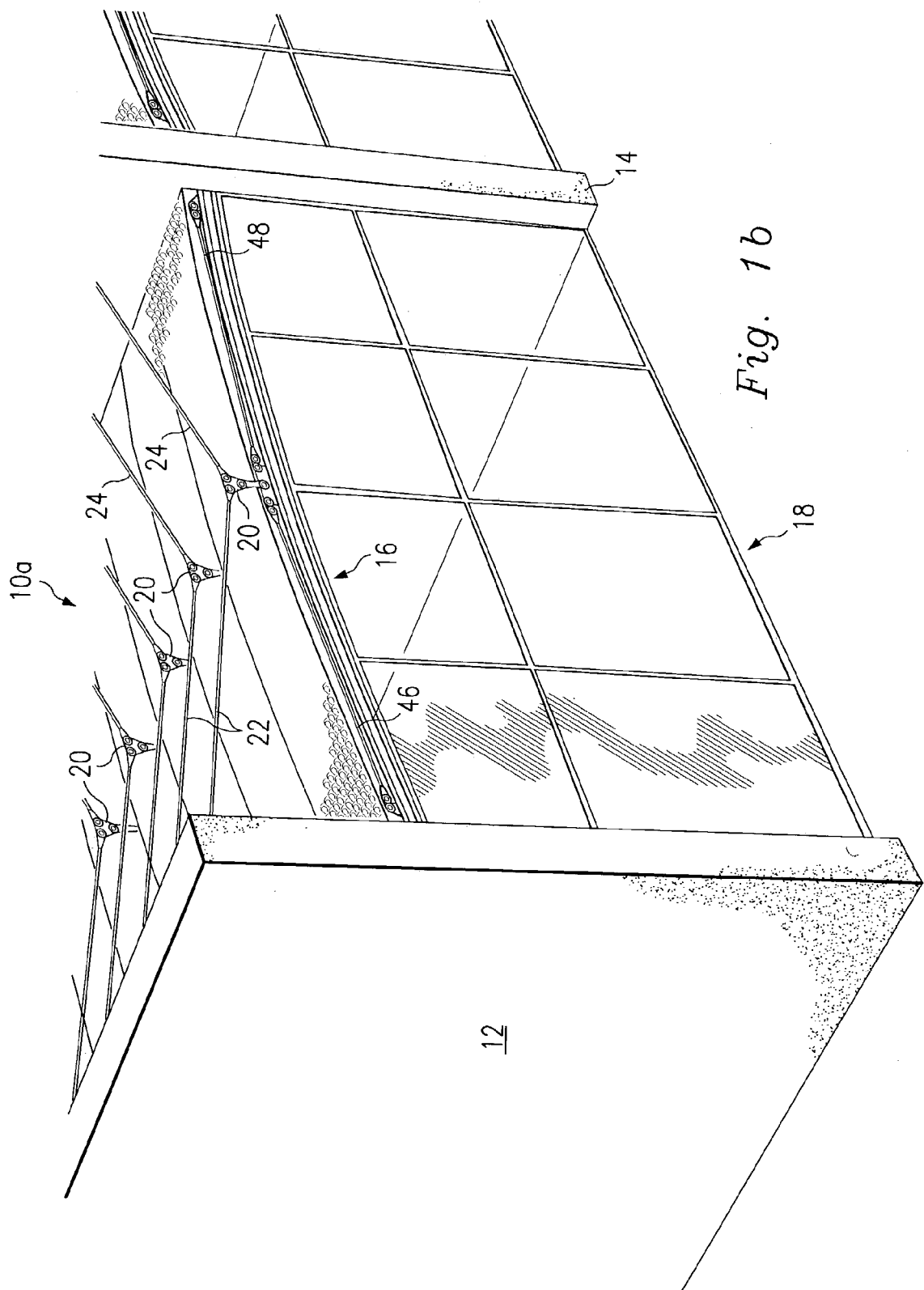

As better shown in FIG. 1b, the section 10a includes a plurality of spaced, generally triangular-shaped, brackets 20 that are mounted to the roof assembly 16 in a manner to be described, and are spaced in a direction from front-to-rear of the building 10. A pair of support rods 22 and 24 are connected at one end to each bracket 20 and extend from the bracket to the upper portions of the walls 12 and 14, respectively, where their other ends are attached, in any conventional manner, to the walls in a plane above the brackets. The rods 22 and 24 thus extend at an angle to the roof assembly, and the design is such that the rods support the roof assembly 16 relative to the walls 12 and 14 in a manner to impart a slight curvature, or arch, to the roof assembly.

As shown in FIG. 1c, the roof assembly 16 includes a light-transmission assembly 30 and a glass panel assembly 32 both of which are supported between the walls 12 and 14 (FIG. 1). To this end, the wall 12 is formed by a plurality of vertically-extending beams, or columns, 34, one of which is shown in FIG. 1c, which are spaced in a direction from front-to-rear of the building 10. The lower ends of the beams 34 are embedded in a foundation 35 extending below the building 10 in a conventional manner, and the beams are covered by a facade 36.

A bracket 38 is mounted to each beam 34 in a conventional manner, and has a flange 38a extending externally of the facade 36 and into the interior of the building 10 for supporting the corresponding marginal edge portions of the light transmission assembly 30. As will be described in detail, the light transmission assembly 30 provides indirect ambient lighting in the interior space of the building 10.

Figure 1D:
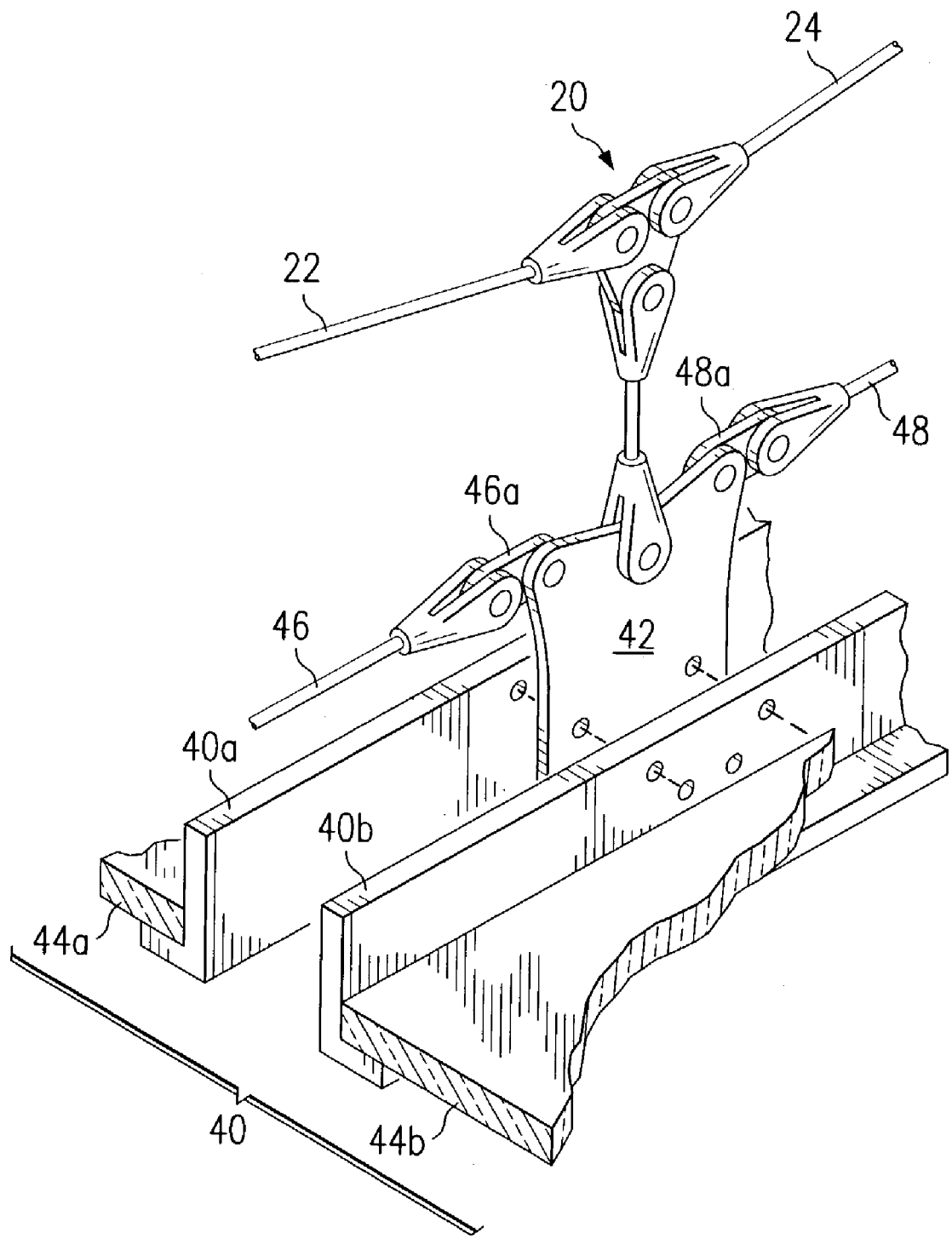
FIG. 1d is a enlarged, partial, exploded isometric view of components of the building section of FIGS. 1b and 1c.
Figure 2C:
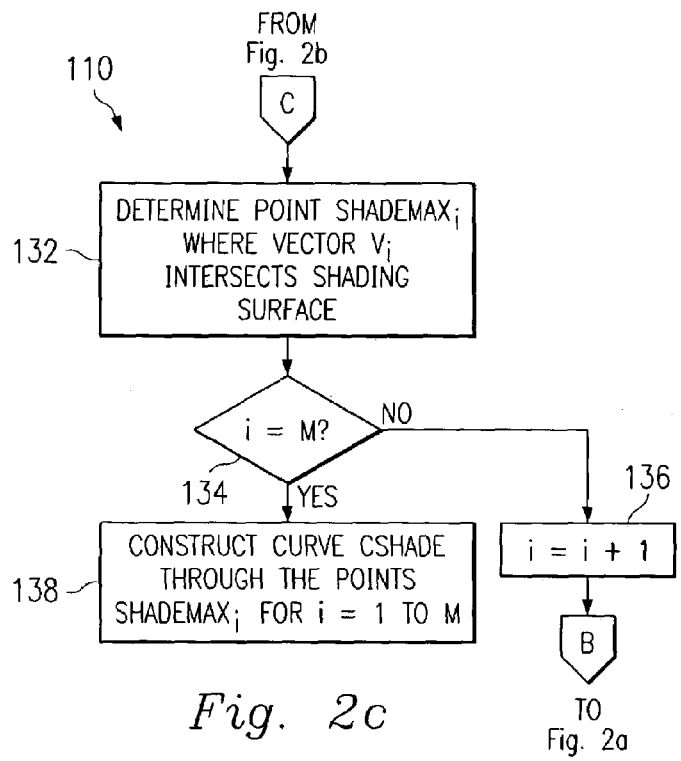

The glass panel assembly 32 extends below, generally parallel to, and slightly spaced from, the light transmission assembly 30, and includes a plurality of spaced, horizontally-extending, beam assemblies 40, one of which is shown in FIG. 1d. Each beam assembly 40 includes two L-shaped beams 40a and 40b disposed in a back-to-back relationship with a mounting plate 42 extending therebetween. The beams 40a and 40b and the plate 42 are connected together in any known manner, such as by bolts, or the like, (not shown) extending through aligned openings in the beams and the plate. The beam assemblies 40 extend generally horizontally between the walls 12 and 14, are mounted to the walls in any convention manner, and are spaced apart in a direction from front-to-rear along the building 10.

The glass panel assembly 32 also includes two glass panels 44a and 44b associated with each beam assembly 40. The marginal edge portions of the panels 44a and 44b are supported by the horizontal legs of the corresponding beams 40a and 40b, respectively, of each beam assembly 40. Two additional glass panels, identical to the panels 44a and 44b, are supported by each of the remaining beam assemblies 40 so that the glass panels span the entire distance between the walls 12 and 14, and between the front wall 18 (FIG. 1a) and the rear wall (not shown) of the building 10. It is understood that, in relatively large installations, single glass panels 44a and 44b, as well as the remaining glass panels, may not span the entire width of the building section 10a but rather can be divided up into a plurality of sections.

As also shown in FIG. 1d, each bracket 20 is pivotally mounted to a corresponding plate 42, and the corresponding rods 22 and 24 are pivotally mounted to the bracket. Since these pivotal mountings are conventional, they will not be described in detail.

Two additional support rods 46 and 48 are pivotally mounted, via links 46a and 48a, respectively, to each plate 42. The rods 46 and 48 extend substantially horizontally and, as shown in FIGS. 1b and 1c, extend to the walls 12 and 14, respectively, and are connected to the latter walls 12 and 14 in any conventional manner to further support the roof 16 between the walls 12 and 14. Thus, the number of brackets 20, and associated rods 22, 24, 46, and 48 correspond to the number of beam assemblies 40.

Referring again to FIG. 1c, a U-shaped gutter 50 is disposed in the wall 12 and is connected to the beam 34 in any conventional manner. The gutter 50 extends between the beam 34 and its corresponding adjacent beam (not shown), and it is understood that additional gutters, identical to the gutter 50, extend between the other adjacent beams 34 in the wall 12. A plurality of plate-like guide members 52, which may be formed by weather stripping, or the like, extend from the glass panel assembly 32, through an opening in the facade 36, and terminate in an area just above the corresponding gutter 50. A vertically-extending drainpipe 54 extends downwardly from each gutter 50, through the remaining height of the wall 12, and through the foundation 35.

It is understood that the wall 14 is identical to the wall 12 and, as such, includes the same components as discussed above as well as identical components of the module 10b, with the exception of the bracket associated with the wall 14 corresponding to the bracket 38, includes flanges, similar to the flange 38a, that extend into the interior of both modules 10a and 10b.

As will be apparent from the following detailed description of the light transmission assembly 30, there is a possibility that rainwater will pass through the assembly and onto the upper surface of the glass panel assembly 32. If this happens, the water will flow, by gravity, across the upper surface of the arched glass panel assembly 32, in a direction from the highest point of the assembly to its lowest point at the marginal edges of the assembly, and thus towards the walls 12 and 14. With respect to the water flowing across the assembly 32 towards the wall 12, the guide members 52 function to direct the water from the assembly 32, into the wall 12, and into the gutters, including the gutter 50, for discharge to the area below the foundation 35, via the drainpipes 54. Of course the water flowing towards the wall 14 is directed and discharged in the same manner by the gutters and drainpipes associated with the latter wall.

The sections 10b, 10c, 10d, and 10e of the building 10 are constructed in the same manner as the section 10a and therefore will not be described in detail.

Figures 3, 4:
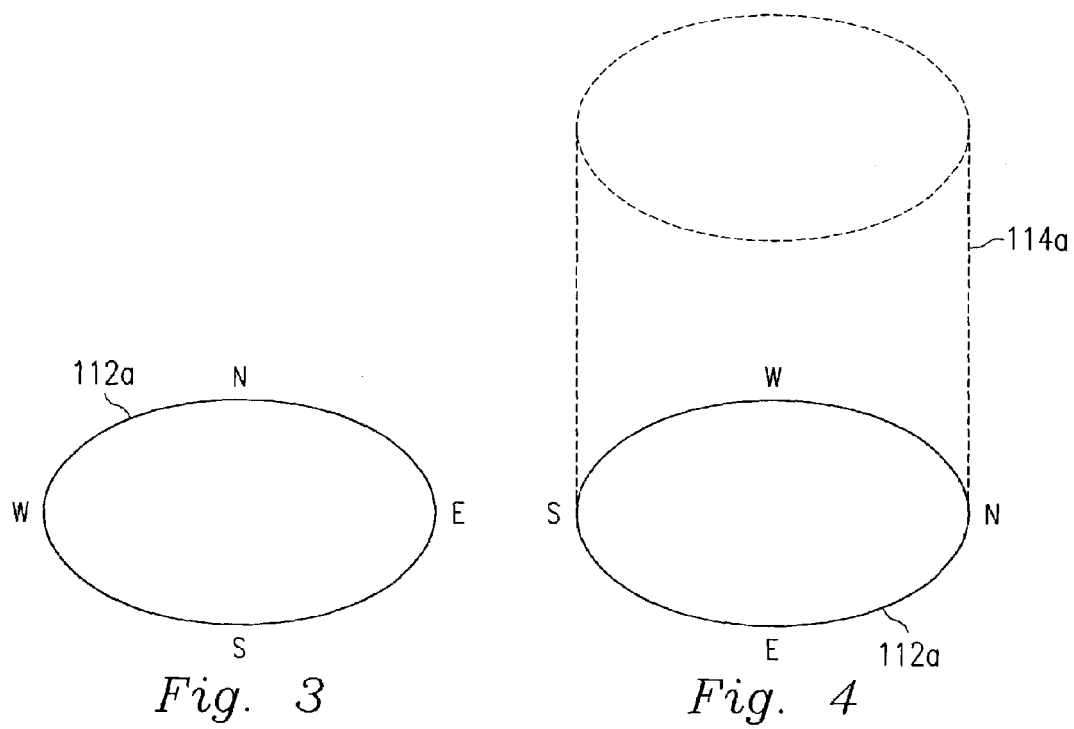
FIG. 3 is a perspective view of an embodiment of a roof light for the building of FIGS. 1a-1d.
FIG. 4 is a perspective view of an embodiment of a shading surface for the roof light of FIG. 3.

Referring to FIGS. 2a, 2b, 2c, and 3-10, the reference numeral 110 refers, in general, to an illustrative embodiment of a method of designing a shading system for a roof light 112a that is part of the light transmission assembly 30 of FIGS. 1a-1c for providing indirect ambient lighting in the interior space of the building 10. Initially, the shape, orientation, and the geographic location of the roof light 112a are determined in step 112. In an exemplary embodiment, as illustrated in FIG. 3, the roof light 112a is circular and is located in a horizontal plane in Dallas, Tex. at a latitude of 32.5 N.

The shape of a shading surface 114a for the roof light 112a is then determined in step 114. The shading surface 114a prevents rays of direct light from the sun from passing through the surface of the roof light 112a. In this manner, the natural lighting of an interior of the building 10 is limited to indirect or diffuse ambient lightwaves thereby preventing hard shadows in the interior of the building. In an exemplary embodiment, as illustrated in FIG. 4, the shading surface 114a is a right circular cylinder having an inside diameter that is equal to the diameter of the circular roof light 112a that surrounds and is perpendicular to the plane of the roof light.

Figure 5:
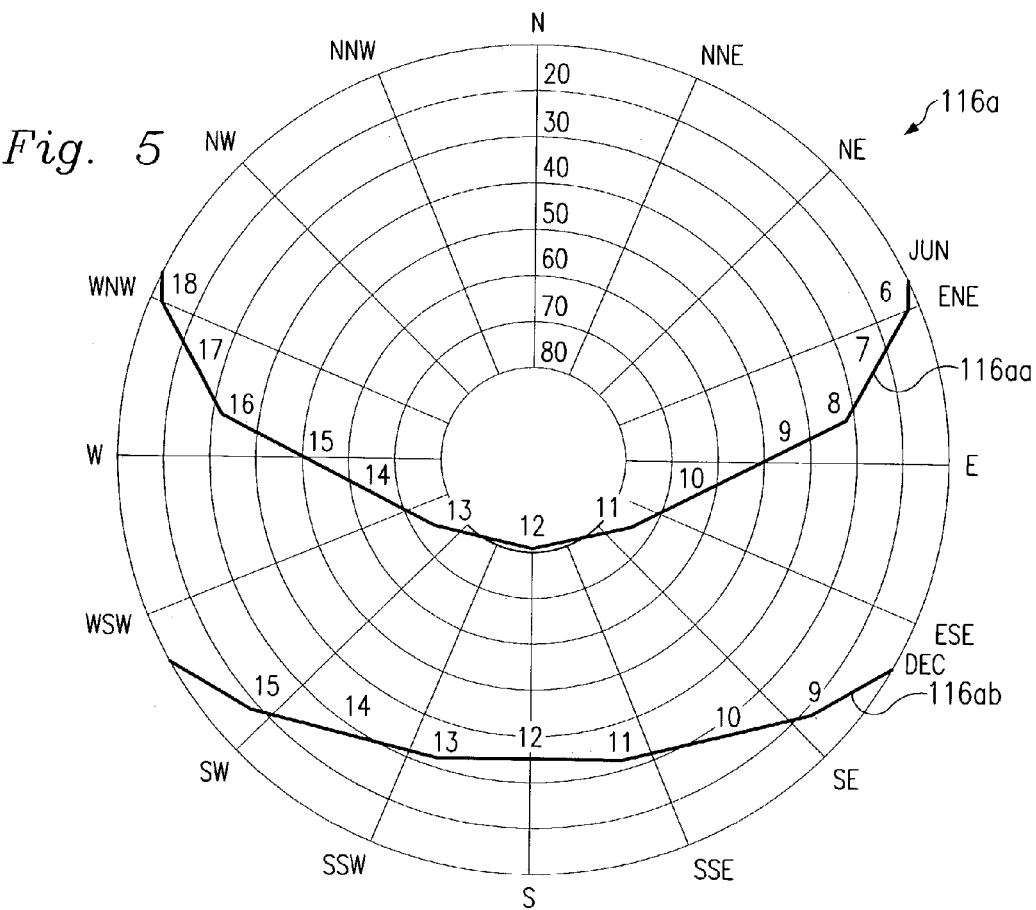
FIG. 5 is a schematic illustration of the sun path for the roof light of FIG. 3.

The sun path 116a for the geographic location and orientation of the roof light 112a is then determined in step 116. The sun path 116a defines the azimuthal angular position $\alpha$ and the angular altitude $\beta$ of the sun for a selected latitude. The azimuthal angular position $\alpha$ of the sun defines the angular location of the sun during the movement of the sun from east to west in the sky, and the angular altitude $\beta$ of the sun defines the angular altitude of the sun in the sky relative to the plane of the roof light 112a. In an exemplary embodiment, for a latitude of 32.5° N, as illustrated in FIG. 5, the maximum altitude $\beta$ of the sun occurs for the summer solstice as defined by the sun path 116aa, and the minimum altitude $\beta$ of the sun occurs on the winter solstice as defined by the sun path 116ab. In an exemplary embodiment, the sun path 116a for the geographic location and orientation of the roof light 112a is determined using conventional methods such as, for example, those disclosed in ASHRAE Fundamentals Handbook, SI Edition, 1997, 29.16 to 29.17, the disclosure of which is incorporated herein by reference.

Figure 6:
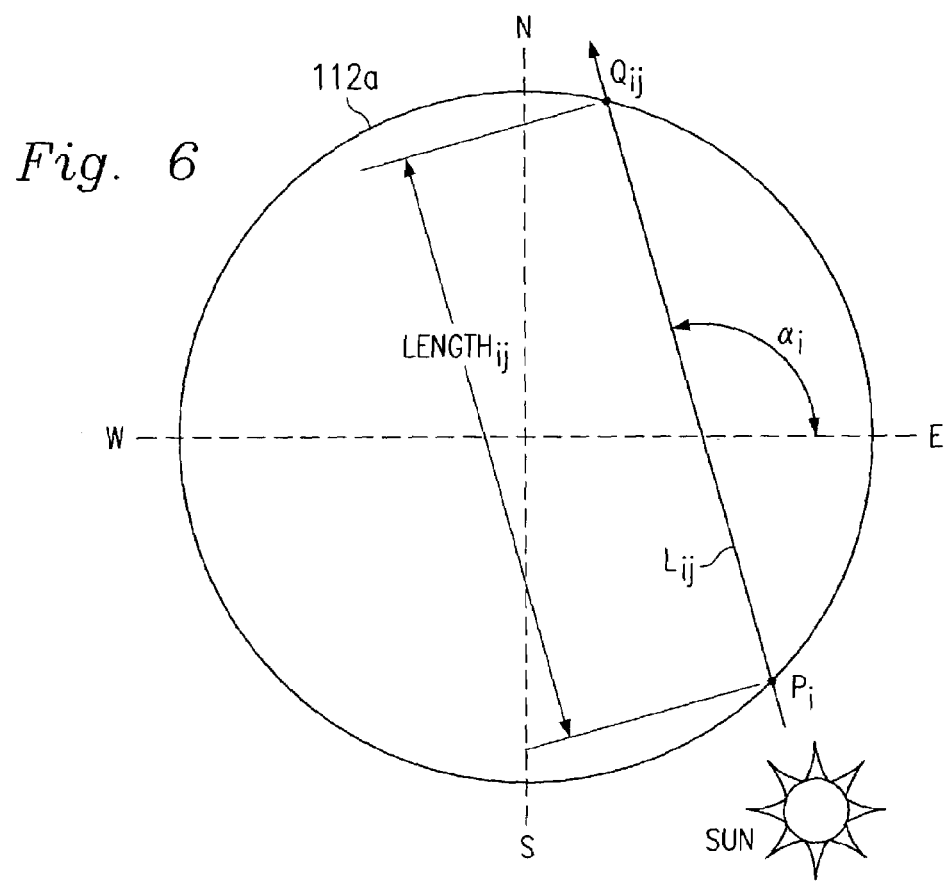

As illustrated in FIG. 6, an initial point $P_i$ around the perimeter of the roof light 112a and an initial angle of solar azimuth $\alpha_j$ are defined in step 118. In an exemplary embodiment, i may vary from 1 to M, and j may vary from 1 to N. In this manner, the shading system for the roof light 112a may be determined by analyzing a plurality of M discrete points $P_i$ and N discrete solar azimuthal angles $\alpha_j$. For each angle of solar azimuth $\alpha_j$, a line $L_{ij}$ is drawn across the plane of the roof light 112a from the point $P_i$ to the corresponding point $Q_{ij}$ at the intersection of the line $L_{ij}$ with the opposite side of the perimeter of the roof light in step 120. The length LENGTH$_{ij}$ of the line $L_{ij}$ is then determined in step 122.

Figure 7:
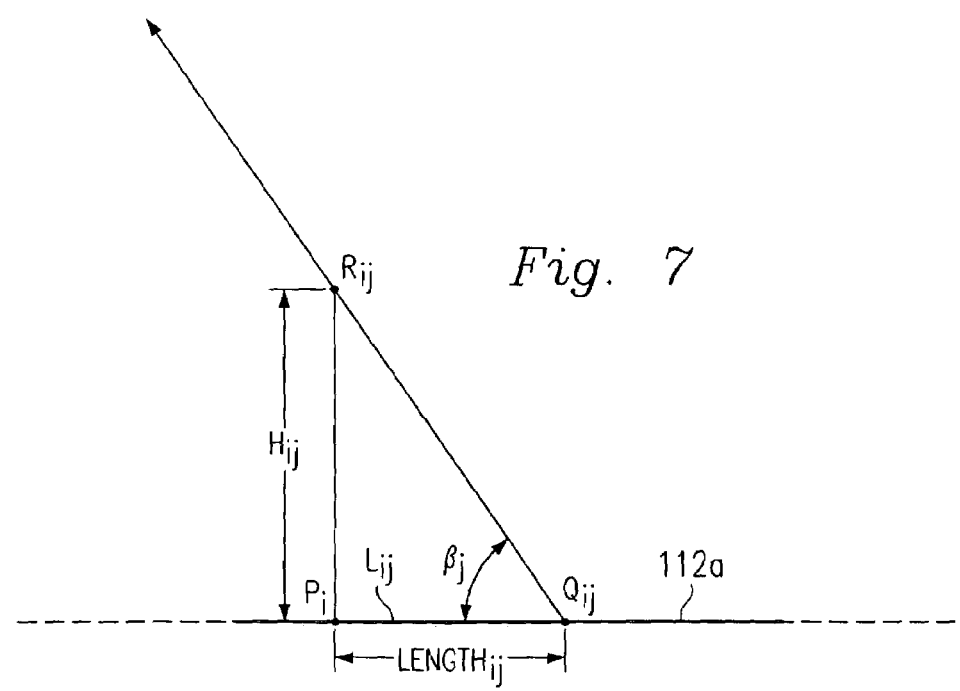

As illustrated in FIG. 7, for each angle of solar azimuth $\alpha_j$, the corresponding angle of solar altitude $\beta_j$ is then used to determine the height $H_{ij}$ of a point $R_{ij}$ directly above the point $P_i$ in step 124.

In an exemplary embodiment, the angles of solar altitude $\beta_j$ for the summer solstice, as provided by the sun path 116aa, are used to determine the height $H_{ij}$ of a point $R_{ij}$ directly above the point $P_i$ in step 124 in order to ensure that the shading system can prevent direct sunlight from passing through the roof light 112a throughout the year. Thus, in an exemplary embodiment, the point $R_{ij}$ is representative of the source of direct light waves from the sun directed toward the point $Q_{ij}$ during the summer solstice.

Figure 8:
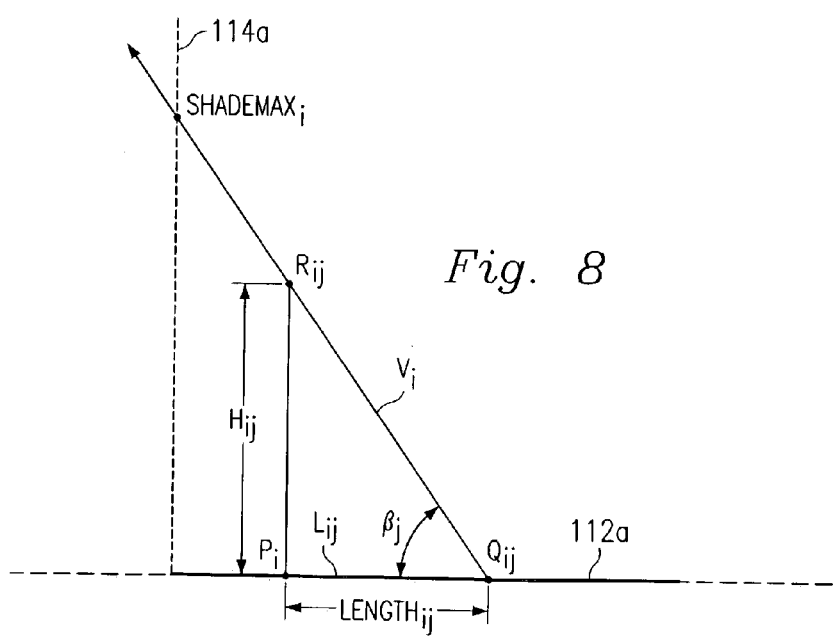
FIGS. 6, 7 and 8 are schematic illustrations of an embodiment of a process for determining the critical shading surface for the roof light and shading surface of FIG. 4.

If j is not equal to N in step 126, then the index value j is increased in step 128, and steps 120, 122, 124, and 126 are repeated. Alternatively, if j is equal to N in step 126, then, for j=1 to N, the point $R_{ij}$ having the maximum height $H_{ij}$ is then determined, and, as illustrated in FIG. 8, a vector $V_i$ is then constructed that extends from the point $Q_{ij}$ corresponding to the point $R_{ij}$ having the maximum height $H_{ij}$ through the point $R_{ij}$ in step 130. The point SHADEMAX$_i$ at which the vector $V_i$ intersects the shading surface 114a is then determined in step 132.

Thus, the point SHADEMAX$_i$ is representative of the corresponding point in space on the shading surface 114a at which direct light waves from the sun during the summer solstice will impact the shading surface.

If i is not equal to M in step 134, then the index value i is increased in step 136, and steps 120, 122, 124, 126, 128, 130, 132, and 134 are repeated. Alternatively, if i is equal to M in step 134, then a curve CSHADE is drawn through the points SHADEMAX$_i$, for i=1 to M in step 138.

Figure 9:
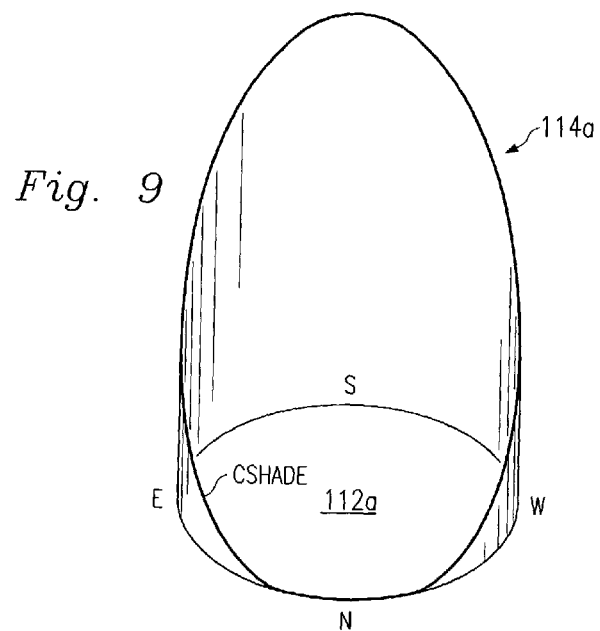
FIG. 9 is a perspective view of an embodiment of the shading system for the roof light of FIG. 3.
Figure 10:
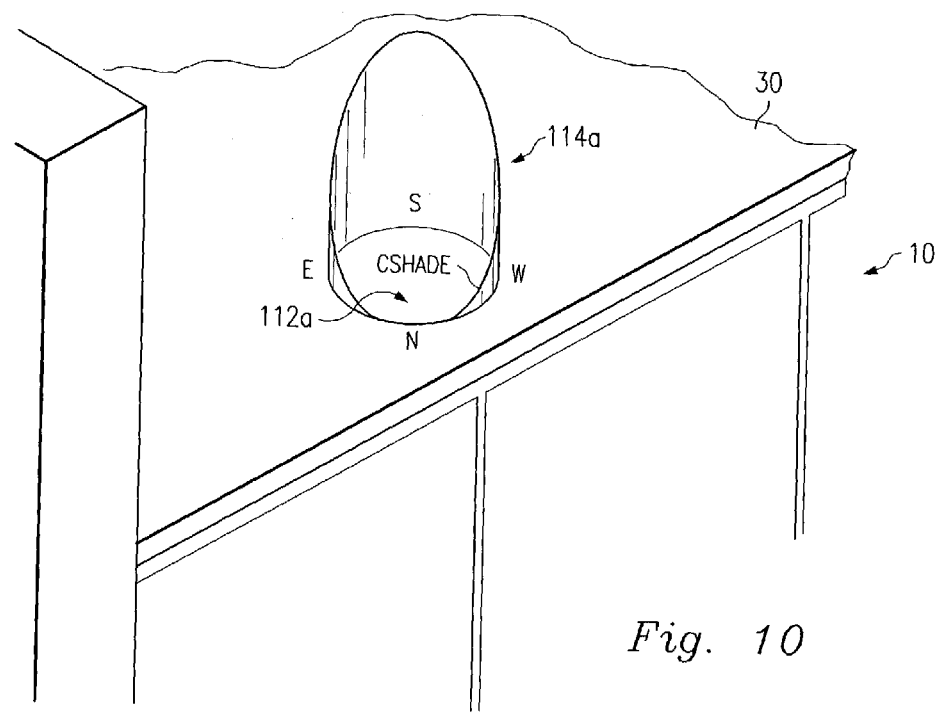
FIG. 10 is a partial perspective view of the building of FIGS. 1a-1d incorporating the roof light and shading system of FIG. 9.

As illustrated in FIG. 9, the curve CSHADE defines the boundary of the shading surface 114a required to ensure that the shading surface prevents direct sunlight from impacting the surface of the roof light 112a. As illustrated in FIG. 10, the roof light 112a and shading surface 114a bounded by the curve CSHADE may then be utilized in light transmission assembly 30 in order to provide indirect ambient light waves into the interior of the building. Thus, the curve CSHADE defines the minimum profile of the shading surface 114a required to prevent direct sunlight from passing through the roof light 112a throughout a solar year, and thereby also defines the profile of the shading surface 114a that permits the maximum amount of indirect sunlight to pass through the roof light through the solar year.

In an exemplary embodiment, one or more of the steps 112 to 138 of the method 110 are incorporated into a computer program that is implemented by a programmable general purpose computer. In this manner, the design of the shading system for the roof light 112a may be provided in an efficient and cost-effective manner. Furthermore, in an exemplary embodiment, one or more of the steps 112 to 138 are incorporated into a computer program that is implemented in combination with a conventional computer-aided design software such as, for example, Autocad™ software by a programmable general purpose computer.

Figure 11:
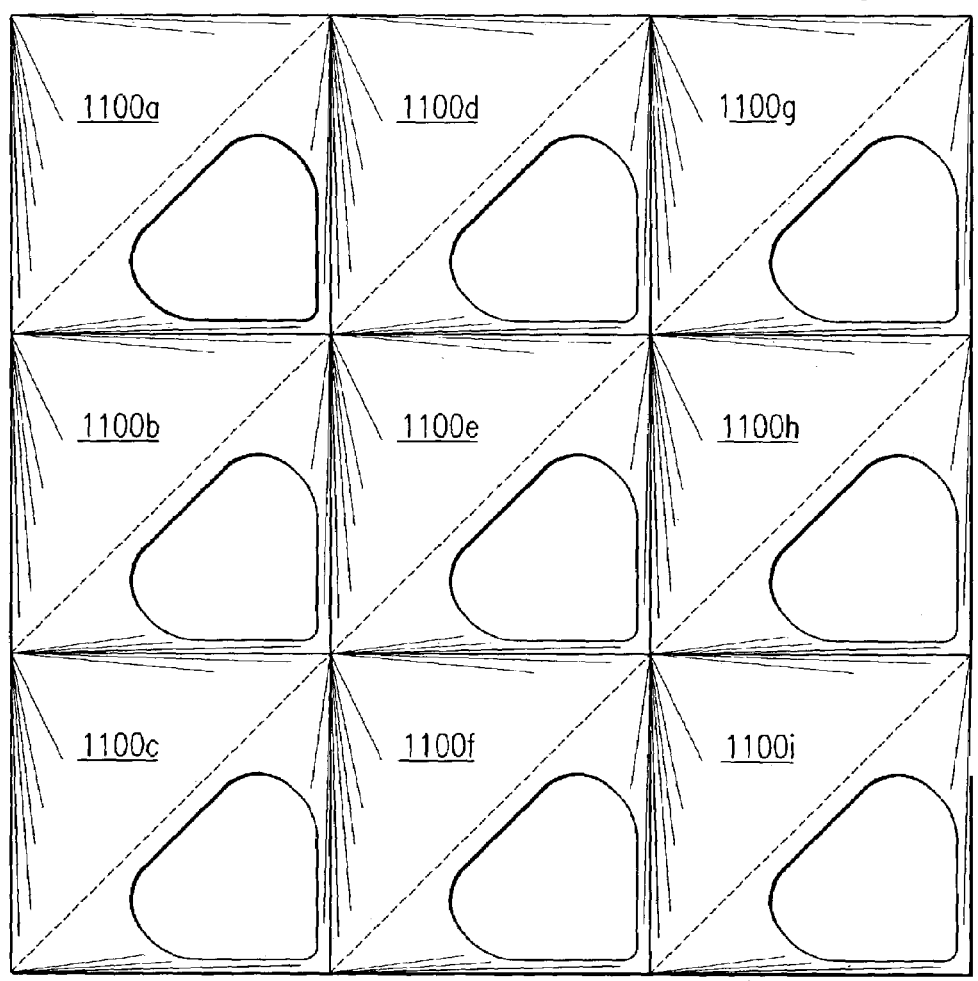
FIG. 11 is a top view of the roof of the building of FIGS. 1a-1d including a plurality of square roof lights divided into triangular sections.

Referring to FIGS. 2a, 2b, 2c, 5, and 11-19b an embodiment of a shading system for a plurality of substantially identical square roof lights 1100a-1100i designed using the method 110 will now be described that may also be incorporated into the light transmission assembly 30 (FIGS. 1a-1c) of the building 10, in order to provide indirect ambient light within the interior space of the building. In step 112, as illustrated in FIG. 11, each of the square roof lights 1100 are positioned in a horizontal plane and are located in Dallas, Tex. at a latitude of 32.5 N. Furthermore, each of the square roof lights 1100 include an upper portion 1100u and a lower portion 1100l that are both right triangles that each include hypotenuses that extends from east to west.

Figure 12:
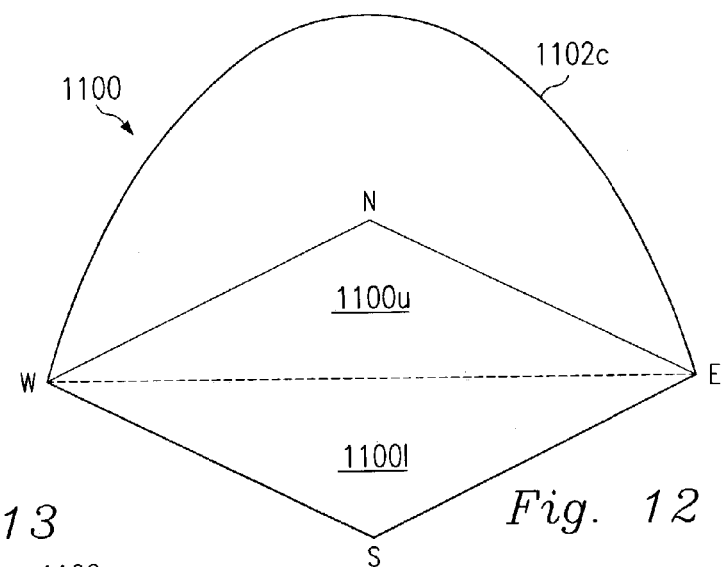
FIG. 12 is a perspective view of an embodiment of the outside envelope of the shading surfaces for the lower triangular section of one of the square roof lights of FIG. 10.
Figure 13:
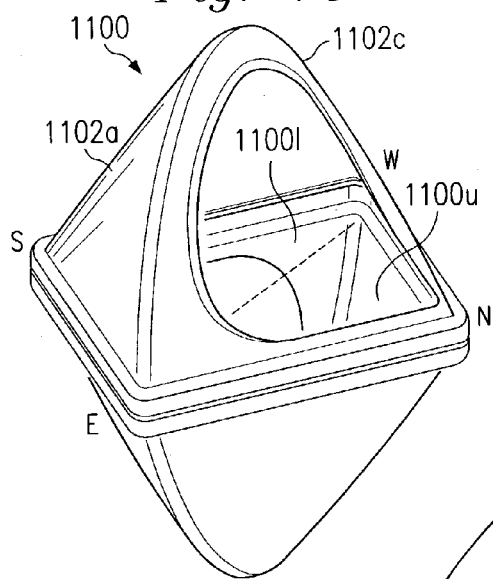
FIG. 13 is a perspective view of an embodiment of a portion of the shading system for the lower triangular section of the square roof light of FIG. 11.
Figure 14:
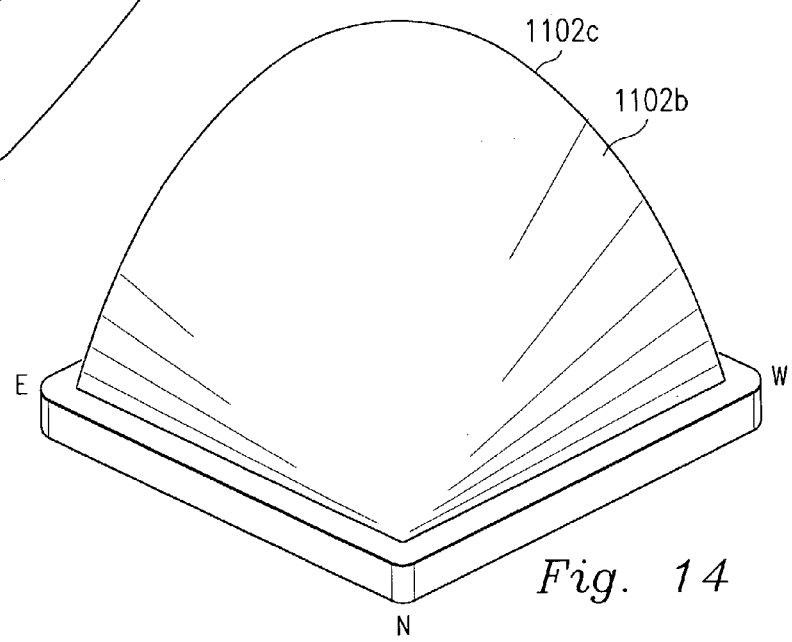
FIG. 14 is a perspective view of an embodiment of a shading surface for the other portion of the shading system for the lower triangular section of the square roof light of FIG. 11.

In step 114, as illustrated in FIGS. 12, 13 and 14, shading surfaces 1102a and 1102b for the lower triangular portion 1100l are then provided that extend above the lower triangular portion and the upper triangular portion 1100u, respectively. The shading surfaces 1102a and 1102b are defined by and extend between a sinusoidal curve 1102c and the perimeters of the lower and upper triangular portions, 1100l and 1100u, respectively.

In step 116, as illustrated in FIG. 5, the sun path 116a for the lower triangular portion 1100l is defined. As described above, in an exemplary embodiment, for a latitude of 32.5 N, the maximum altitude $\beta$ of the sun occurs for the summer solstice as defined by the sun path 116aa, and the minimum altitude $\beta$ of the sun occurs on the winter solstice as defined by the sun path 116ab.

Figure 15:
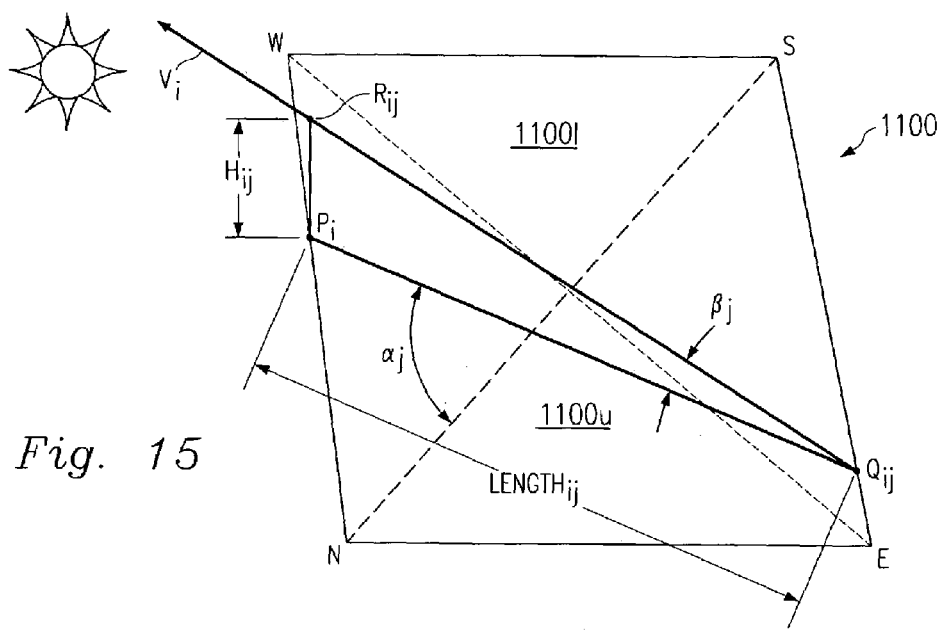
FIGS. 15-17 are schematic illustrations of an embodiment of the determination of the critical shading surface for the shading surface for the other portion of the shading system for the lower triangular section of the square roof light of FIG. 14.

As illustrated in FIG. 15, an initial point $P_i$ around the perimeter of the square roof light 1100 and an initial angle of solar azimuth $\alpha_j$ are defined in step 118. For each angle of solar azimuth $\alpha_j$, a line $L_{ij}$ is drawn across the plane of the square roof light 1100 from the point $P_i$ to the corresponding point $Q_{ij}$ at the intersection of the line $L_{ij}$ with the opposite side of the perimeter of the square roof light in step 120. The length LENGTH$_{ij}$ of the line $L_{ij}$ is then determined in step 122. For each angle of solar azimuth $\alpha_j$, the corresponding angle of solar altitude $\beta_j$ is then used to determine the height $H_{ij}$ of a point $R_{ij}$ directly above the point $P_i$ in step 124.

In an exemplary embodiment, the angles of solar altitude $\beta$j for the summer solstice, as provided by the sun path 116aa, are used to determine the height $H_{ij}$ of a point $R_{ij}$ directly above the point $P_i$ in step 124 in order to ensure that the shading system can prevent direct sunlight from passing through the lower triangular portion 1100l of the roof light 1100 throughout the year. Thus, in an exemplary embodiment, the point $R_{ij}$ is representative of the source of direct light waves from the sun directed toward the point $Q_{ij}$ during the summer solstice.

In an exemplary embodiment, the angles of solar altitude $\beta_j$ for the summer solstice, as provided by the sun path 116aa, are used to determine the height $H_{ij}$ of a point $R_{ij}$ directly above the point $P_i$ in step 124 in order to ensure that the shading system can prevent direct sunlight from passing through the lower triangular section 1100l of the roof light 1100 throughout the year. Thus, in an exemplary embodiment, the point $R_{ij}$ is representative of the source of direct light waves from the sun directed toward the point $Q_{ij}$ during the summer solstice.

Figure 16:
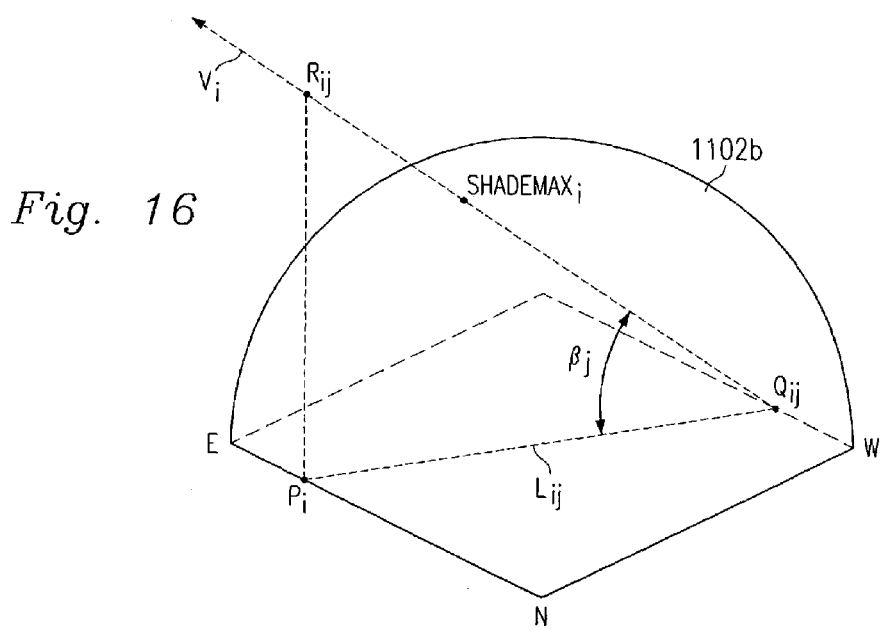

If j is not equal to N in step 126, then the index value j is increased in step 128, and steps 120, 122, 124, and 126 are repeated. Alternatively, if j is equal to N in step 126, then, for j=1 to N, the point $R_{ij}$ having the maximum height $H_{ij}$ is then determined, and, as illustrated in FIG. 16, a vector $V_i$ is then constructed that extends from the point $Q_{ij}$ corresponding to the point $R_{ij}$ having the maximum height $H_{ij}$ through the point $R_{ij}$ in step 130. The point SHADEMAX$_i$ at which the vector $V_i$ intersects the shading surface 1102$b$ is then determined in step 132.

Thus, the point SHADEMAX$_i$ is representative of the corresponding point in space on the shading surface 1102$b$ at which direct light waves from the sun during the summer solstice will impact the shading surface.

If i is not equal to M in step 134, then the index value i is increased in step 136, and steps 120, 122, 124, 126, 128, 130, 132, and 134 are repeated. Alternatively, if i is equal to M in step 134, then a curve CSHADE is drawn through the points SHADEMAX$_i$, for i=1 to M in step 138.

Figure 17:
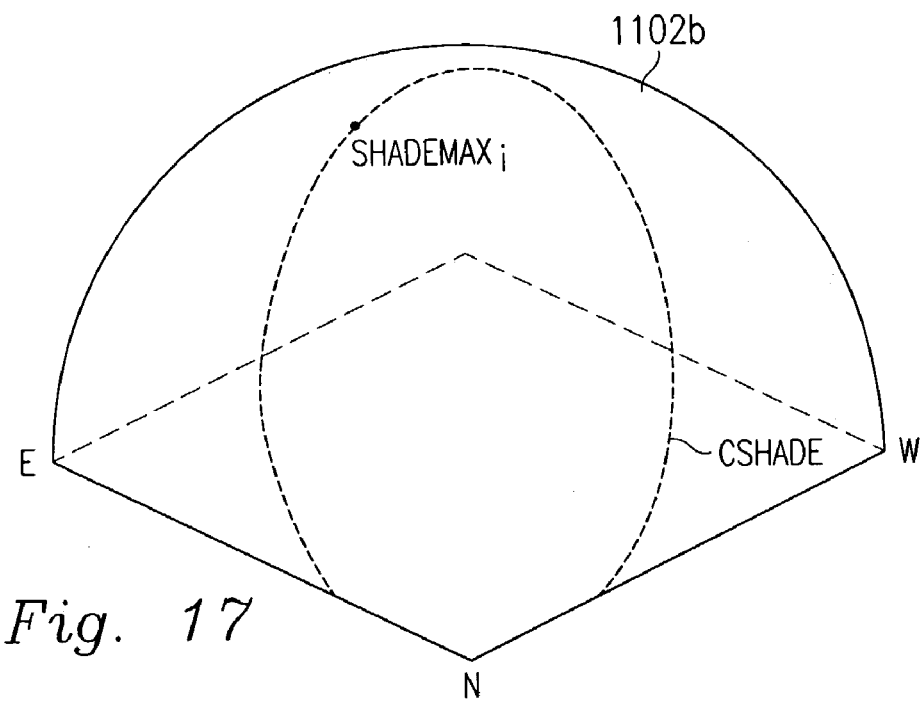

As illustrated in FIG. 17, the curve CSHADE defines the boundary of the shading surface 1102$b$ required to ensure that the shading surface prevents direct sunlight from impacting the surface of the lower triangular portion 1100$l$ of the rooflight 1100. Thus, the curve CSHADE defines the minimum profile of the shading surface 1102$b$ required to prevent direct sunlight from passing through the lower triangular portion 1100$l$ of the roof light 1100 throughout a solar year, and thereby also defines the profile of the shading surface 1102$b$ that permits the maximum amount of indirect sunlight to pass through the lower triangular portion 1100$l$ of the roof light 1100 through the solar year.

Figure 18:
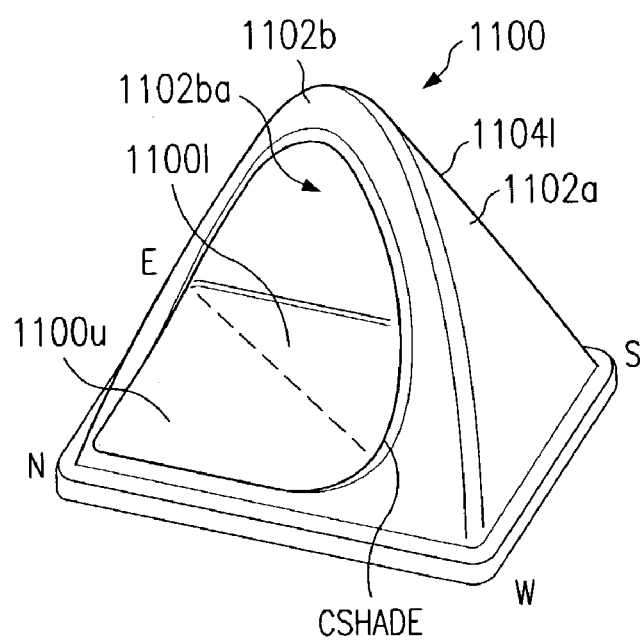
FIG. 18 is a perspective illustration of the shading system for the lower triangular section of the square roof light of FIG. 17.

As illustrated in FIG. 18, the resulting shading system 1104$l$ for the lower triangular portion 1100$l$ of the square roof light 1100 includes the solid shading surface 1102$a$ and the shading surface 1102$b$ including an opening 1102$ba$ that is defined by the curve CSHADE. The size and shape of the opening 1102$ba$ in the shading surface 1102$b$ that is defined by the curve CSHADE prevents direct sunlight from passing through the lower triangular portion 1100$l$ of the square roof light 1100 throughout a solar year, and permits the maximum amount of indirect sunlight to pass through the lower triangular portion of the square roof light throughout the solar year.

Figure 19A:
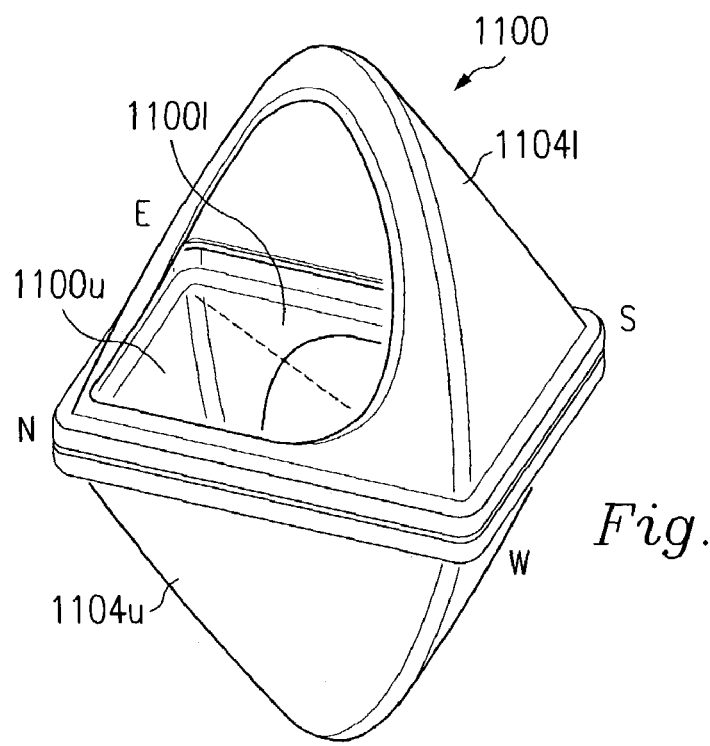
FIG. 19a is a perspective illustration of an embodiment of the shading systems for the upper and lower triangular sections of the square roof light of FIG. 18.
Figure 19B:
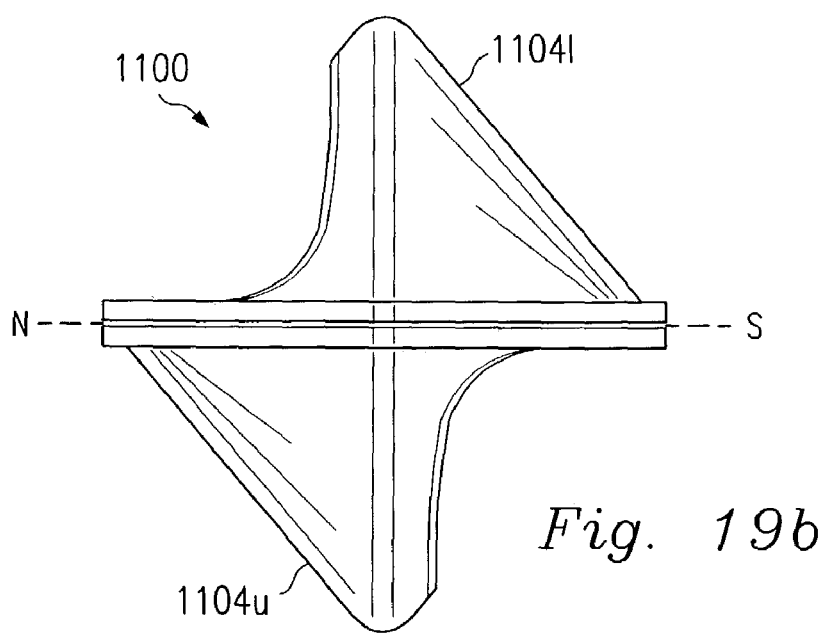

As illustrated in FIGS. 19$a$ and 19$b$, due to the symmetrical design of the upper and lower triangular portions, 1100$u$ and 1100$l$, of the square roof light 1100, a shading system 1104$u$ for the upper triangular portion of the square roof light is then provided that is substantially identical to the shading system 1104$l$ except that the shading system 1104$u$ is positioned below the plane of the square roof light and is rotated 180 degrees relative to the shading system 1104$l$.

Figure 20A:
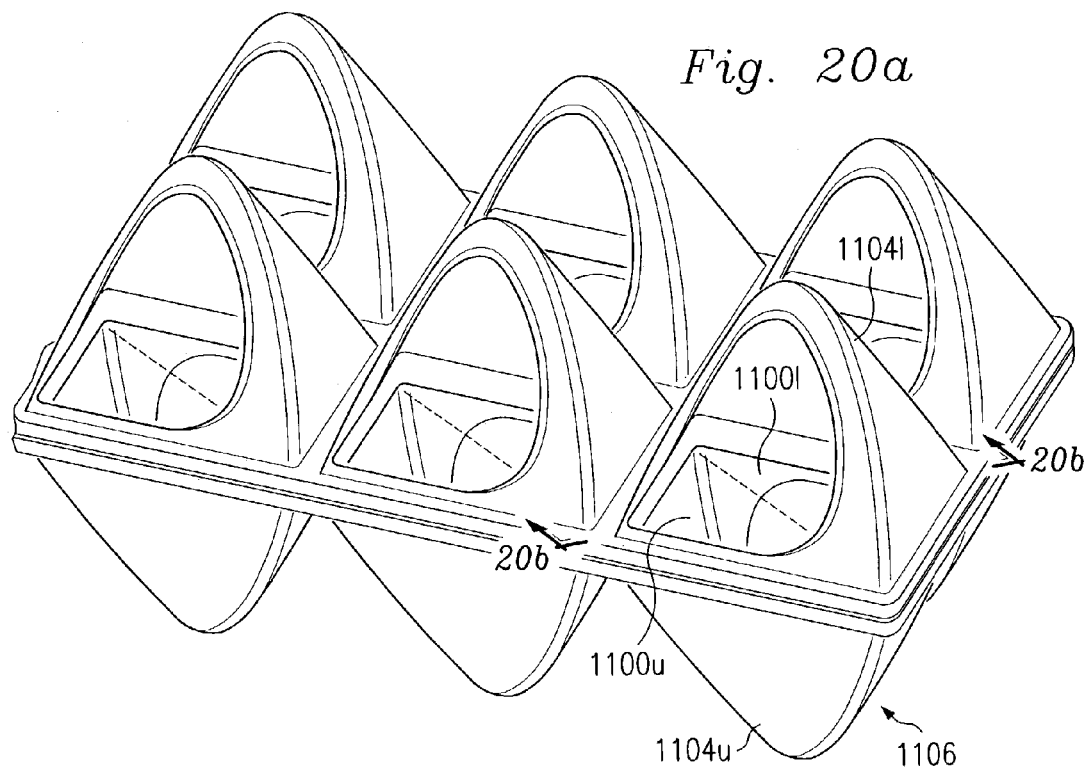
FIG. 20a is a perspective illustration of a roof light module that includes a square roof light, and the shading systems for the upper and lower triangular sections of the square roof light.
Figure 20B:
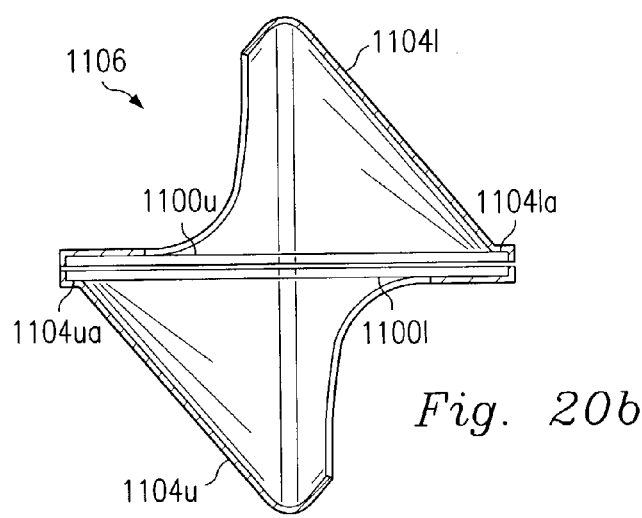

Referring to FIGS. 20$a$ and 20$b$, an exemplary embodiment of a natural lighting module 1106 includes the square roof light 1100, having upper and lower triangular sections, 1100$u$ and 1100$l$, respectively, the upper shading system 1104$u$, and the lower shading system 1104$l$ that sandwich and contain the square roof light within recesses, 1104$ua$ and 1104$la$, formed in the bases of the upper and lower shading systems. In this manner, the natural lighting module 1106 provides a modular construction that facilitates the fabrication of the natural lighting module.

Figure 21A:
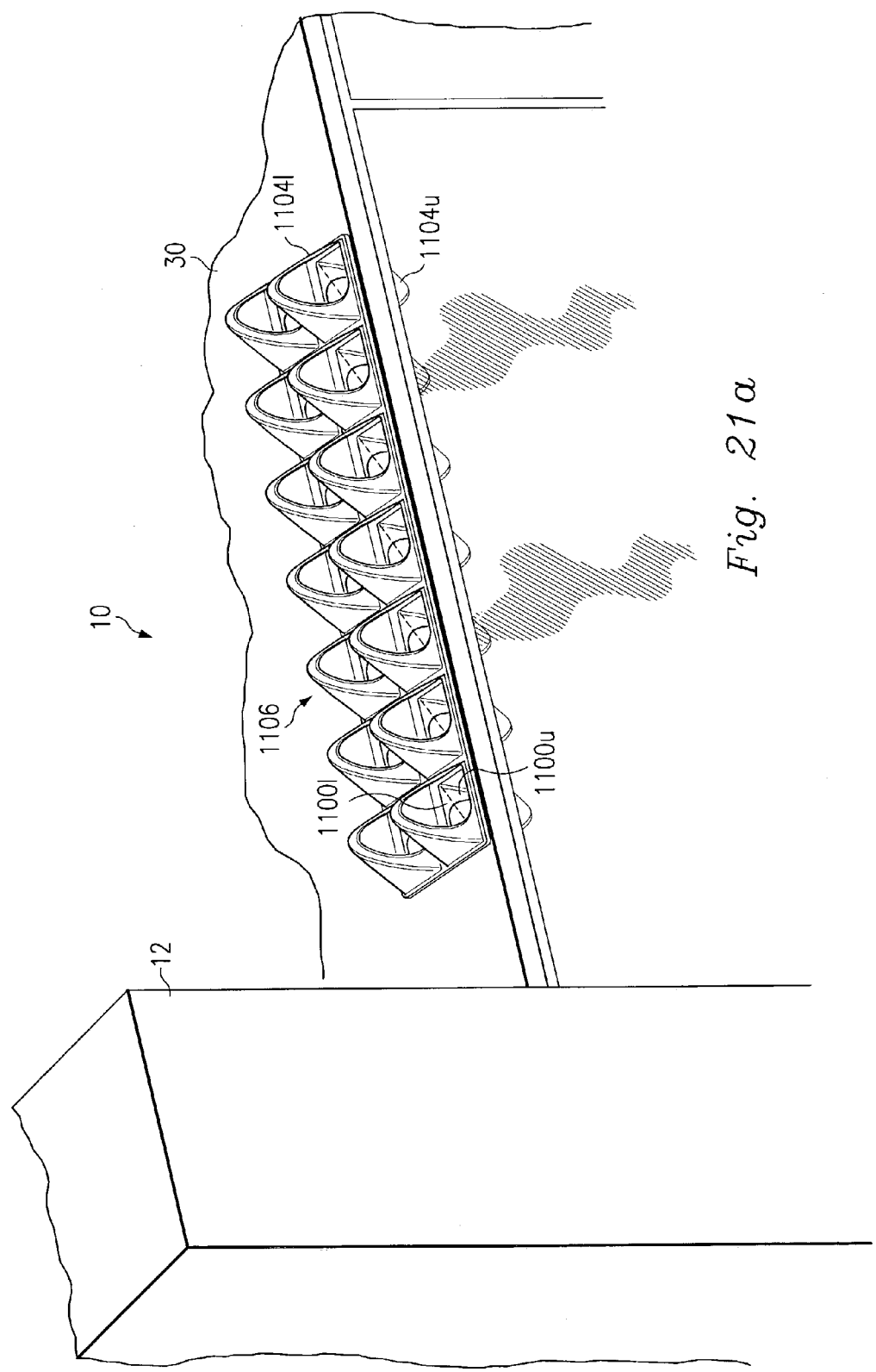
FIG. 21a is a perspective view of an embodiment of the building of FIGS. 1a-1d incorporating the natural lighting module of FIGS. 20a and 20b.
Figure 21B:
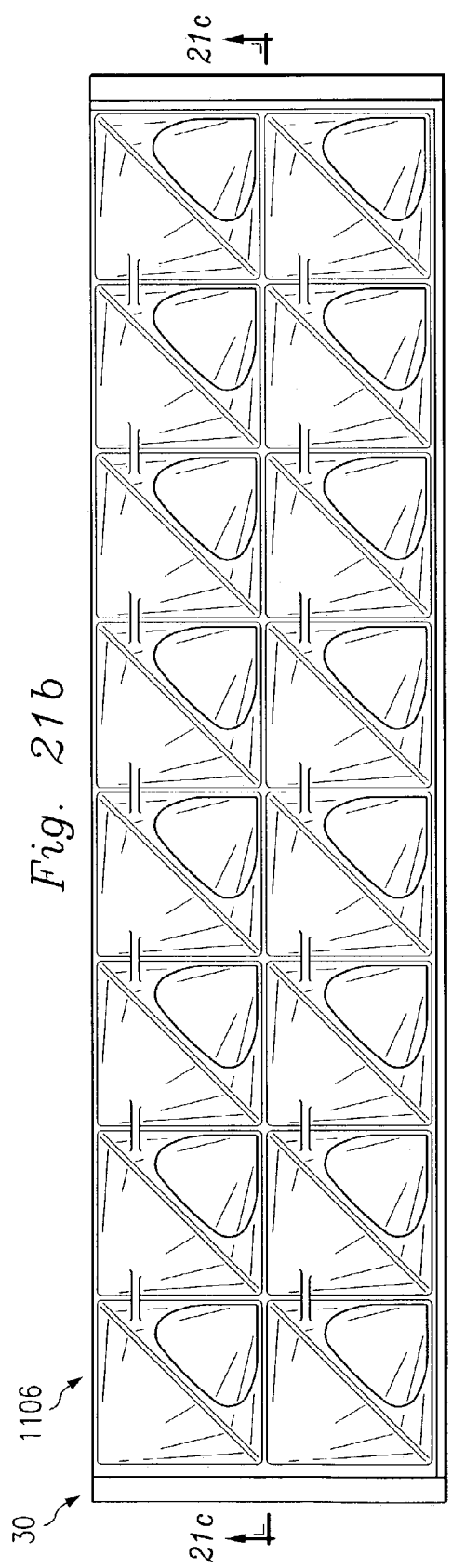
FIG. 21b is a top view of an embodiment of the building of FIGS. 1a-1d incorporating a plurality of the natural lighting modules of FIGS. 20a and 20b.
Figure 21C:
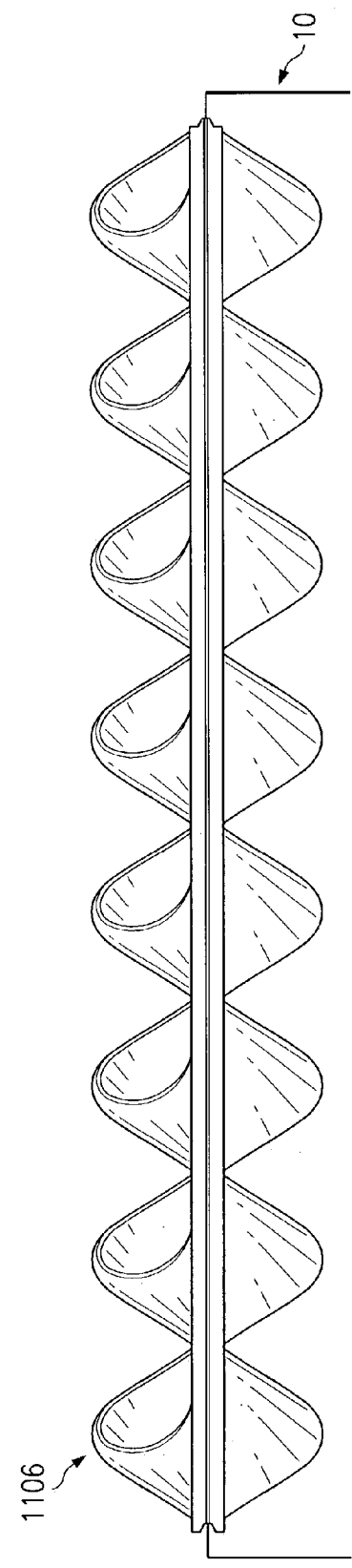
FIG. 21c is a cross sectional view taken along the line 21c-21c of FIG. 21b.

As illustrated in FIG. 21$a$, the natural lighting module 1106 may then be incorporated into the roof 16 (FIG. 1) of the building 10 in order to only provide indirect ambient lighting of the interior of the building. In an exemplary embodiment, the square roof light 1100 is positioned in the plane of the light transmission assembly 30 of the building 10, the lower shading system 1104$l$ extends upwardly out of the plane of the assembly 30, and the upper shading system 1104$u$ extends downwardly out of the plane assembly 30 and into the interior space of the building 10. Furthermore, in an exemplary embodiment, as illustrated in FIGS. 21$b$ and 21$c$, the light transmission assembly 30 may include a plurality of natural lighting modules 1106 that are positioned side by side.

Figure 22:
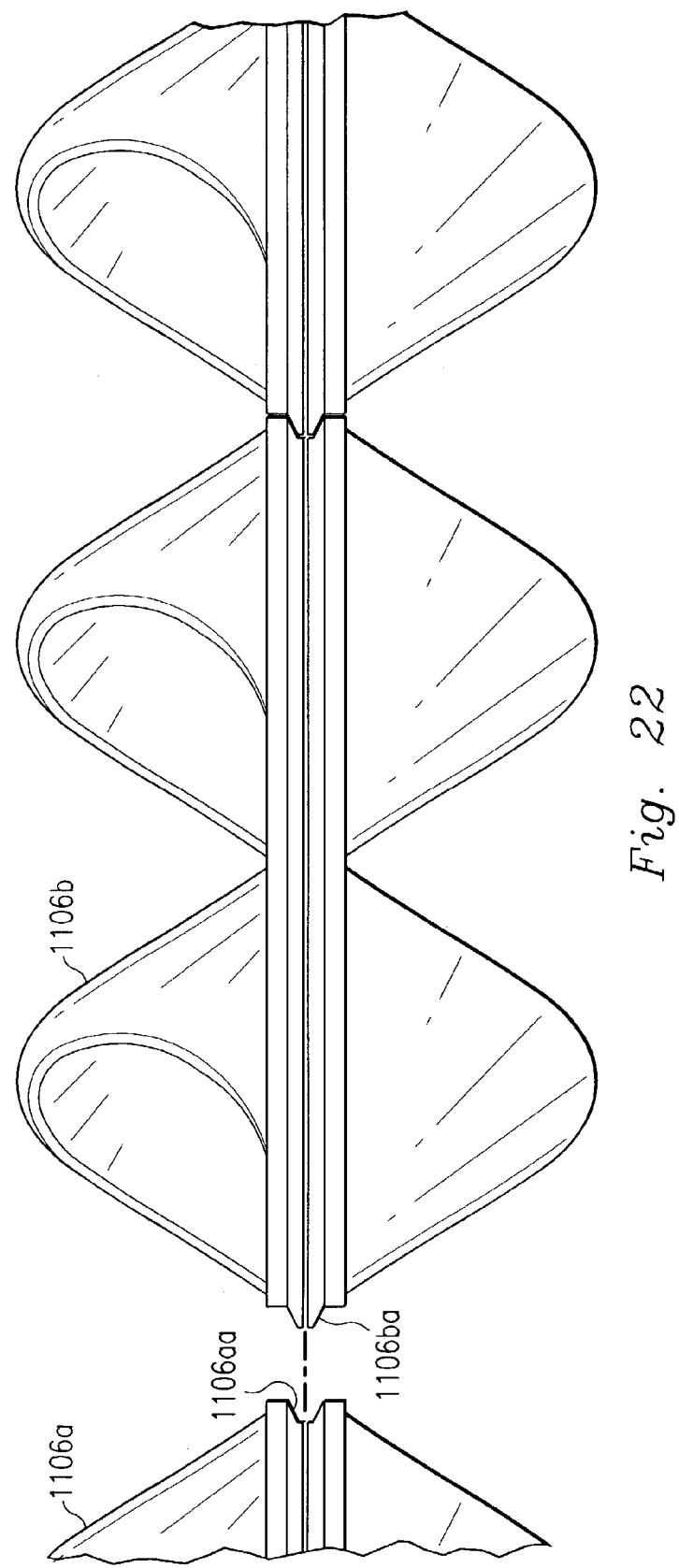
FIG. 22 is an illustration of the interlocking assembly of the adjacent natural lighting modules of FIG. 21b.

In an exemplary embodiment, as illustrated in FIG. 22, adjacent natural lighting modules 1106$a$ and 1106$b$ are coupled by means of a interlocking arrangement in which the natural lighting module 1106$a$ includes a groove 1106$aa$ that is adapted to mate with a tongue 1106$ba$ formed in the natural lighting module 1106$b$. In this manner, the assembly of adjacent natural lighting modules 1106 is made more efficient and precise.

The present embodiments of the invention provide a number of advantages. For example, the ability to provide a shading system for a roof light that prevents (minimizes) direct ambient light waves from entering the interior of a building through the roof light prevents harsh shadows within the interior of the building and also reduces cooling costs associated with cooling the interior of the building. In addition, the method provides a shading system for a roof light that is prevents direct sunlight from passing through the roof light, and permits the maximum amount of indirect or diffuse sunlight to pass through the roof light thereby maximizing the level of indirect or diffuse ambient lighting within a building. As a result, all of the costs associated with providing natural lighting of the interior of a building are reduced. Moreover, the above is accomplished with the addition of the light transmission assembly 30 and the glass panel assembly 32. Further, the unique pivoted bracket/support rod system extending from the roof to the walls of each module of the building supports the assemblies 30, 32 in a manner that minimizes light obstruction to the roof and that compensates for relative movement between the various components of the building due to changes in temperature and weather conditions.

It is understood that variations may be made in the foregoing without departing from the scope of the invention. For example, all or at least a portion of the roof lights 112$a$, 1100, and 1202$a$ may be of different sizes, dimensions, and number, and may be inclined with respect to the horizontal plane. Furthermore, the roof lights 112$a$, 1100, and 1202$a$ may include materials that permit light waves to pass there through such as, for example, glass, or may simply be defined by openings in the roof of the building 10. Moreover, the building 10 is not limited to five modules as disclosed above but can be formed by any number of modules, including one. Also, the spatial references used above, such as "above", "below", "left", "right", etc. were for the purposes of example only and are not intended to limit the specific spatial orientation of the components in question.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A shading system for a roof light positioned in the plane of a roof of a building, comprising a shading surface that prevents direct sunlight from passing through the roof light throughout a solar year and permits the maximum amount of indirect sunlight to pass through the roof light throughout the solar year, where direct sunlight is radiation that arrives at the shading system in a direction substantially parallel to a line extending from the sun to the shading system, and indirect sunlight is radiation that arrives at the shading system in other directions;

wherein at least a portion of the shading surface is positioned above the plane of the roof light; and wherein at least another portion of the shading surface is positioned below the plane of the roof light;

wherein the roof light is divided up into a plurality of sections; wherein at least a portion of the shading surface positioned above the plane of the roof light prevents direct sunlight from passing through some of the sections of the roof light throughout the solar year and permits the maximum amount of indirect sunlight to pass through the some sections roof light throughout the solar year; and wherein at least another portion of the shading surface positioned below the plane of the roof light prevents direct sunlight from passing through another of the sections of the roof light throughout the solar year and permits the maximum amount of indirect sunlight to pass through the other sections of roof light throughout the solar year.

2. A shading system for a roof light positioned in the plane of a roof of a building, comprising a shading surface that is free of moving parts and that prevents direct sunlight from passing through the roof light throughout a solar year and permits the maximum amount of indirect sunlight to pass through the roof light throughout the solar year, where direct sunlight is radiation that arrives at the shading system in a direction substantially parallel to a line extending from the sun to the shading system, and indirect sunlight is radiation that arrives at the shading system in other directions.

3. The shading system of claim 2, wherein at least a portion of the shading surface is positioned above the plane of the roof light; and wherein at least another portion of the shading surface is positioned below the plane of the roof light.

4. An apparatus comprising a shading system that controls entry of sunlight into a building through an aperture, the shading system having a shading portion which is free of moving parts and which provides only the minimum amount of shading needed to prevent any direct sunlight from entering the building through the aperture throughout the solar year, while permitting indirect sunlight to enter the building though the aperture, where direct sunlight is radiation that arrives at the shading system in a direction substantially parallel to a line extending from the sun to the shading system, and indirect sunlight is radiation that arrives at the shading system in other directions.

5. An apparatus according to claim 4, wherein the shading portion includes first and second shade portions disposed on opposite sides of the aperture.

6. An apparatus according to claim 4, wherein the aperture is approximately circular.

7. An apparatus comprising a shading system that controls entry of sunlight into a building through an aperture, the shading system having a shading portion which provides only the minimum amount of shading needed to prevent any direct sunlight from entering the building through the aperture throughout the solar year, while permitting indirect sunlight to enter the building though the aperture, where direct sunlight is radiation that arrives at the shading system in a direction substantially parallel to a line extending from the sun to the shading system, and indirect sunlight is radiation that arrives at the shading system in other directions;

wherein the shading portion includes first and second shade portions disposed on opposite sides of the aperture;

wherein the aperture has mutually exclusive first and second aperture portions;

wherein the first shade portion provides only the minimum amount of shading needed to prevent any direct sunlight from entering the building through the first aperture portion throughout the solar year; and wherein the second shade portion provides only the minimum amount of shading needed to prevent any direct sunlight from entering the building through the second aperture portion throughout the solar year.

8. An apparatus according to claim 7, wherein the first and second shade portions each have in a side thereof facing the aperture a recess which communicates optically with the aperture, and each have in a further side thereof an opening which extends from an exterior surface thereof to the recess therein.

9. An apparatus according to claim 8, wherein the shading portion has a base portion with the aperture therein, the first and second shade portions projecting outwardly from the base portion on opposite sides thereof.

10. An apparatus according to claim 9, wherein the first and second aperture portions lie on opposite sides of an imaginary line that extends across the aperture and are mirror images of each other with respect to the imaginary line; and wherein the first and second shade portions are mirror images of each other about the imaginary line.

11. An apparatus comprising:

a shading system that controls entry of sunlight into a building through an aperture, the shading system having a shading portion which provides only the minimum amount of shading needed to prevent any direct sunlight from entering the building through the aperture throughout the solar year, while permitting indirect sunlight to enter the building though the aperture;

wherein the shading portion includes first and second shade portions disposed on opposite sides of the aperture;

wherein the aperture has mutually exclusive first and second aperture portions;

wherein the first shade portion provides only the minimum amount of shading needed to prevent any direct sunlight from entering the building through the first aperture portion throughout the solar year;

wherein the second shade portion provides only the minimum amount of shading needed to prevent any direct sunlight from entering the building through the second aperture portion throughout the solar year;

wherein the first and second shade portions each have in a side thereof facing the aperture a recess which communicates optically with the aperture, and each have in a further side thereof an opening which extends from an exterior surface thereof to the recess therein;

wherein the shading portion has a base portion with the aperture therein, the first and second shade portions projecting outwardly from the base portion on opposite sides thereof;

wherein the base portion is approximately square;

wherein the aperture has approximately the shape of a square; and wherein the first and second aperture portions each have approximately the shape of a right triangle.

12. An apparatus comprising:

a shading system that controls entry of sunlight into a building through an aperture, the shading system having a shading portion which provides only the minimum amount of shading needed to prevent any direct sunlight from entering the building through the aperture throughout the solar year, while permitting indirect sunlight to enter the building though the aperture;

wherein the shading portion includes first and second shade portions disposed on opposite sides of the aperture;

wherein the aperture has mutually exclusive first and second aperture portions;

wherein the first shade portion provides only the minimum amount of shading needed to prevent any direct sunlight from entering the building through the first aperture portion throughout the solar year;

wherein the second shade portion provides only the minimum amount of shading needed to prevent any direct sunlight from entering the building through the second aperture portion throughout the solar year;

wherein the first and second shade portions each have in a side thereof facing the aperture a recess which communicates optically with the aperture, and each have in a further side thereof an opening which extends from an exterior surface thereof to the recess therein;

wherein the shading portion has a base portion with the aperture therein, the first and second shade portions projecting outwardly from the base portion on opposite sides thereof; and wherein the exterior surface of each of the first and second shade portions includes an elongate strip surface that follows approximately a sinusoidal curve from the region of a first location on the base portion to the region of a second location on an opposite side of the base portion, and includes first and second shading surfaces disposed on opposite sides of the strip surface and each extending from a respective edge of the strip surface to a respective perimeter section of the base portion that extends between the first and second locations, the opening in each of the first and second shade portions opening through the first shading surface thereon.

13. An apparatus according to claim 12, wherein the base portion is approximately square;

wherein the aperture has approximately the shape of a square; and wherein the first and second aperture portions each have approximately the shape of a right triangle.

14. An apparatus comprising a shading system that controls entry of sunlight into a building, the shading system having means defining an aperture, and having shading means that is free of moving parts for providing only the minimum amount of shading needed to prevent any direct sunlight from entering the building through the aperture throughout the solar year, and for permitting indirect sunlight to enter the building though the aperture, where direct sunlight is radiation that arrives at the shading system in a direction substantially parallel to a line extending from the sun to the shading system, and indirect sunlight is radiation that arrives at the shading system in other directions.

15. An apparatus comprising a shading system that controls entry of sunlight into a building, the shading system having means defining an aperture, and having shading means for providing only the minimum amount of shading needed to prevent any direct sunlight from entering the building through the aperture throughout the solar year, and for permitting indirect sunlight to enter the building though the aperture, where direct sunlight is radiation that arrives at the shading system in a direction substantially parallel to a line extending from the sun to the shading system, and indirect sunlight is radiation that arrives at the shading system in other directions;

wherein the aperture has mutually exclusive first and second aperture portions; and wherein the shading means has first shade means for providing only the minimum amount of shading needed to prevent any direct sunlight from entering the building through the first aperture portion throughout the solar year, and has second shade means for providing only the minimum amount of shading needed to prevent any direct sunlight from entering the building through the second aperture portion throughout the solar year.

16. An apparatus according to claim 15, wherein the means defining the aperture is disposed between the first and second shade means, the first and second shade means projecting outwardly from the aperture on opposite sides thereof.

17. An apparatus according to claim 16, wherein the first and second aperture portions lie on opposite sides of an imaginary line that extends across the aperture and are mirror images of each other with respect to the imaginary line; and wherein the first and second shade means are mirror images of each other about the imaginary line.

18. An apparatus comprising:

a shading system that controls entry of sunlight into a building, the shading system having means defining an aperture, and having shading means for providing only the minimum amount of shading needed to prevent any direct sunlight from entering the building through the aperture throughout the solar year, and for permitting indirect sunlight to enter the building though the aperture;

wherein the aperture has mutually exclusive first and second aperture portions;

wherein the shading means has first shade means for providing only the minimum amount of shading needed to prevent any direct sunlight from entering the building through the first aperture portion throughout the solar year, and has second shade means for providing only the minimum amount of shading needed to prevent any direct sunlight from entering the building through the second aperture portion throughout the solar year;

wherein the means defining the aperture is disposed between the first and second shade means, the first and second shade means projecting outwardly from the aperture on opposite sides thereof;

wherein the base portion is approximately square;

wherein the aperture has approximately the shape of a square; and wherein the first and second aperture portions each have approximately the shape of a right triangle.

19. An apparatus comprising a shading system that controls entry of sunlight into a building through an aperture, the shading system having first and second shade portions disposed on opposite sides of the aperture, the first and second shade portions being mirror images of each other about an imaginary line which extends across the aperture, the first and second shade portions each having in a side thereof facing the aperture a recess which communicates optically with the aperture, and each having in a further side thereof an opening which extends from an exterior surface thereof to the recess therein.

20. An apparatus according to claim 19, wherein the shading system has a base portion which has the aperture therein and which is disposed between the first and second shade portions; and wherein the exterior surface of each of the first and second shade portions includes an elongate strip surface that follows approximately a sinusoidal curve from the region of a first location on the base portion to the region of a second location on an opposite side of the base portion, and includes first and second shading surfaces disposed on opposite sides of the strip surface and each extending from a respective edge of the strip surface to a respective perimeter section of the base portion that extends between the first and second locations, the opening in each of the first and second shade portions opening through the first shading surface thereon.

21. An apparatus according to claim 20, wherein the base portion is approximately square; and wherein the aperture has approximately the shape of a square.

22. An apparatus according to claim 19, wherein the shading system prevents any direct sunlight from entering the building through the aperture throughout the solar year, while permitting indirect sunlight to enter the building though the aperture.

23. An apparatus comprising a shading system that controls entry of sunlight into a building, the shading system having means defining an aperture and having first and second shade means for providing shade with respect to the aperture, the first and second shade means being disposed on opposite sides of the aperture and being mirror images of each other about an imaginary line which extends across the aperture, the first and second shade means each having in a side thereof facing the aperture a recess which communicates optically with the aperture, and each having in a further side thereof an opening which extends from an exterior surface thereof to the recess therein.

24. An apparatus according to claim 23, wherein the aperture has approximately the shape of a square.

25. An apparatus according to claim 23, wherein the first and second shade means prevent any direct sunlight from entering the building through the aperture throughout the solar year, while permitting indirect sunlight to enter the building though the aperture.

26. An apparatus comprising a shading system that controls entry of sunlight into a building through an aperture, where sunlight includes first radiation that arrives at the shading system in a direction substantially parallel to a line extending from the sun to the shading system, and includes second radiation that arrives at the shading system in other directions, the shading system having a shading portion that is free of moving parts and that provides only the minimum amount of shading needed to block all of the first radiation from entering the building through the aperture throughout the solar year, while permitting at least part of the second radiation to enter the building though the aperture.

27. An apparatus according to claim 26, wherein the shading portion includes first and second shade portions disposed on opposite sides of the aperture.

28. An apparatus according to claim 26, wherein the aperture is approximately circular.

29. An apparatus comprising a shading system that controls entry of sunlight into a building through an aperture, where sunlight includes first radiation that arrives at the shading system in a direction substantially parallel to a line extending from the sun to the shading system, and includes second radiation that arrives at the shading system in other directions, the shading system having a shading portion that provides only the minimum amount of shading needed to block all of the first radiation from entering the building through the aperture throughout the solar year, while permitting at least part of the second radiation to enter the building though the aperture;

wherein the shading portion includes first and second shade portions disposed on opposite sides of the aperture;

wherein the aperture has mutually exclusive first and second aperture portions;

wherein the first shade portion provides only the minimum amount of shading needed to prevent any of the first radiation from entering the building through the first aperture portion throughout the solar year; and wherein the second shade portion provides only the minimum amount of shading needed to prevent any of the first radiation from entering the building through the second aperture portion throughout the solar year.

30. An apparatus according to claim 24, wherein the first and second shade portions each have in a side thereof facing the aperture a recess which communicates optically with the aperture, and each have in a further side thereof an opening which extends from an exterior surface thereof to the recess therein.

31. An apparatus according to claim 30, wherein the shading portion has a base portion with the aperture therein, the first and second shade portions projecting outwardly from the base portion on opposite sides thereof.

32. An apparatus according to claim 31, wherein the first and second aperture portions lie on opposite sides of an imaginary line that extends across the aperture and are mirror images of each other with respect to the imaginary line; and wherein the first and second shade portions are mirror images of each other about the imaginary line.

33. An apparatus according to claim 31, wherein the base portion is approximately square;

wherein the aperture has approximately the shape of a square; and wherein the first and second aperture portions each have approximately the shape of a right triangle.

34. An apparatus according to claim 31, wherein the exterior surface of each of the first and second shade portions includes an elongate strip surface that follows approximately a sinusoidal curve from the region of a first location on the base portion to the region of a second location on an opposite side of the base portion, and includes first and second shading surfaces disposed on opposite sides of the strip surface and each extending from a respective edge of the strip surface to a respective perimeter section of the base portion that extends between the first and second locations, the opening in each of the first and second shade portions opening through the first shading surface thereon.

35. An apparatus according to claim 34, wherein the base portion is approximately square;

wherein the aperture has approximately the shape of a square; and wherein the first and second aperture portions each have approximately the shape of a right triangle.

* * * * *